US012748074B2

(12) United States Patent
Biller et al.

(10) Patent No.: US 12,748,074 B2
(45) Date of Patent: Sep. 29, 2026

(54) ELECTROMAGNETIC INDUCTIVE COUPLING ANALYSIS (EMICA) FOR ON-BOARD OR IN-LAB DETECTION OF DEFECTS IN THICK OR THIN CARBON FIBER LAMINATES

(71) Applicant: TDA Research, Inc, Wheat Ridge, CO (US)

(72) Inventors: Joshua R Biller, Evergreen, CO (US); David Long, Golden, CO (US); Bradley Spatafore, Westminster, CO (US); Kevin Finch, Lakewood, CO (US)

(73) Assignee: TDA Research, Inc., Golden, CO (US)

( * ) Notice: Subject to any disclaimer, the term of this patent is extended or adjusted under 35 U.S.C. 154(b) by 386 days.

(21) Appl. No.: 18/222,249

(22) Filed: Jul. 14, 2023

(65) Prior Publication Data

US 2024/0310331 A1 Sep. 19, 2024

Related U.S. Application Data

(60) Provisional application No. 63/389,829, filed on Jul. 15, 2022.

(51) Int. Cl.
*G01N 27/82* (2006.01)

(52) U.S. Cl.
CPC .................................... *G01N 27/82* (2013.01)

(58) Field of Classification Search
None
See application file for complete search history.

(56) References Cited

U.S. PATENT DOCUMENTS

| | | | | |
|---|---|---|---|---|
| 3,719,882 A * | 3/1973 | Pincus | G01V 3/108 324/330 |
| 7,755,351 B2 * | 7/2010 | Brady | G01N 27/9046 324/222 |
| 8,350,581 B1 * | 1/2013 | Brady | G01N 33/44 324/658 |
| 2015/0015259 A1 * | 1/2015 | Duan | G01R 33/48 324/309 |
| 2015/0212044 A1 * | 7/2015 | Goldfine | G01R 33/0094 324/240 |
| 2017/0284189 A1 * | 10/2017 | Thornberry | E21B 49/08 |
| 2021/0302372 A1 * | 9/2021 | Soejima | G01M 5/0083 |
| 2022/0042938 A1 * | 2/2022 | Bhunia | G01R 33/3692 |
| 2023/0366846 A1 * | 11/2023 | Feng | G01N 27/20 |

* cited by examiner

*Primary Examiner* — Dominic E Hawkins
(74) *Attorney, Agent, or Firm* — Sarah Hill; Brian Elliott

(57) ABSTRACT

A device and a method of using the device to detect flaw and defects in carbon fiber laminates. The device contains an electromagnetic inductive coupling flaw detection for carbon fiber laminates with an excitor-detector operated with alternating current, an impedance matched RLC circuit and a vector-network-analyzer. The device can generate a 2-dimensional or a 3-dimensional representation to indicate a flaw location in a carbon fiber laminate.

12 Claims, 33 Drawing Sheets

| Feature | Estimated Depth (mm) |
|---|---|
| 90° Wraps | 0 – 3 |
| 12° Wraps | 3 – 3.75 |
| 40° Wraps | 3.75 – 4.5 |
| 33° Wraps | 4.5 – 5.25 |
| 24° Wraps | 5.25 – 6 |
| 20° Wraps | 6 – 6.75 |
| Triangle Delamination | 6 – 6.75 |
| 90° Wraps | 6.75 – 9 |
| 12° Wraps | 9 – 9.75 |
| 90° Wraps | 9.75 – 12 |

Figure 24.

| Feature | Estimated Depth (mm) |
|---|---|
| 90° Wraps | 0 – 3 |
| 12° Wraps | 3 – 3.75 |
| 40° Wraps | 3.75 – 4.5 |
| 33° Wraps | 4.5 – 5.25 |
| 24° Wraps | 5.25 – 6 |
| 20° Wraps | 6 – 6.75 |
| Triangle Delamination | 6 – 6.75 |
| 90° Wraps | 6.75 – 9 |
| 12° Wraps | 9 – 9.75 |
| 90° Wraps | 9.75 – 12 |

SSIM = 0.924, NMI = 1.65, MSE = 0.0066, PSNR = 21.8345

ELECTROMAGNETIC INDUCTIVE COUPLING ANALYSIS (EMICA) FOR ON-BOARD OR IN-LAB DETECTION OF DEFECTS IN THICK OR THIN CARBON FIBER LAMINATES

CROSS REFERENCE TO RELATED APPLICATIONS

The present application claims the benefit of the provisional application No. 63/389,829 filed Jul. 15, 2022 (titled Electromagnetic Inductive Coupling Analysis (EMICA) for on-board or in-lab detection of defects in thick or thin carbon fiber laminates, by Joshua R. Biller, which is incorporated by reference herein.

STATEMENT REGARDING U.S. GOVERNMENT SUPPORT

This invention was made with government support under Department of Energy SBIR Phase I Contract No. DE-SC0019981. The government has certain rights in the invention.

BACKGROUND OF THE INVENTION

Fuel-cell-electric-vehicles (FCEV) use compressed hydrogen gas ($H_2$) to produce a driving range which is competitive with gasoline and battery powered vehicles. Next generation 700 bar storage tanks, which can achieve this range, must balance tank size/weight and $H_2$ carrying capacity. Composite overwrap pressure vessels (COPV) consist of a carbon fiber shell with either metal (Type III) or plastic (Type IV) liner. Carbon fiber materials have better strength to weight ratios than metals, but a drawback of carbon fiber structural materials are their novel failure modes which are not as well understood as failure modes in metals. Carbon fiber composites are subject to a failure mode called stress rupture where the composite fails over time at operating pressure. This uncertainty means that a larger safety margin is needed which in turn leads to the use of thicker carbon fiber overwraps in the COPV, which increases tank cost and weight. To help reduce engineering overdesign and provide feedback on tank safety, TDA has developed a non-destructive structural health monitoring (SHM) method based on the measurement and analysis of the electromagnetic signature of the carbon fiber overwraps used in COPV.

Composites differ from conventional metal tank materials in how they respond to damage. Under load, local damages such as resin cracking or fiber/resin debonding can occur, without any corresponding visual indication. Low energy impacts can leave the top surface unchanged but can cause internal deformation in the bulk or the back of the part—which is especially worrisome for COPV containing compressed $H_2$. Non- or barely visible impact damage can cause a 65% loss in compression static strength. Carbon fiber composites are also susceptible to damage from over-pressurization, and to a separate mode of failure called stress rupture that doesn't occur with metal tanks. Reducing the amount of carbon fiber materials while maintaining safety margins will require a deeper understanding of failure modes, and there are no NDE methods currently available that can characterize carbon-fiber to predict future failure. It is necessary for both safety and public acceptance (people still associate hydrogen with the Hindenburg disaster), methods are needed to monitor the tanks as the come off the manufacturing line and while they are in use.

Currently, non-destructive evaluation using lock-in thermography is used for aerospace materials and structures. For example, the materials used to fabricate aircraft (composites, hybrid composites, sandwiches, metals) are surveyed for delamination, impact damage, fatigue failure[1]. X-ray imaging technology is used for primary aeronautical composite structures, both during the manufacturing process and during the repair and re-use of key components[2]. These methods are not readily field portable, and extraordinarily expensive, even in the factory. Ultrasound technology is also widely used for inspection, but requires liquid couplants and is inhibited by the rough, uneven outer layer on many DOT rated COPV. Thus, there is a need for rapid, robust and accurate detection of defect types from manufacturing or from routine use over time, Conventional eddy current testing (ECT) is another widespread NDE method, but it can only be used on conductive metal parts and only detect defects on the surface. TDA's technology can be considered an extension of ECT. A few other researchers have evaluated variations of eddy current testing for other applications[3, 4]. These approaches are different from what TDA has developed because they are using two coil design with an excitor and receiver/detector. They are also monitoring different parameters than TDA. Most of this work is at the academic level. One exception is Jentek Sensors Inc. is a small business that developing an enhanced eddy current NDT method for corrosion and cracks detection in aerospace structures. Much of their work focuses on metal structures but there are some references to using lower frequencies to evaluate carbon fiber composites.

U.S. Ser. No. 10/317,367B2 and U.S. Pat. No. 9,222,915B2 are examples of eddy-current testing methods applied to flaw detection in metals. In both cases, the detection method is applied to metal structures in and around nuclear reactors, for instance core structures or assessment of welds in pressure vessels. The parameters described in these patents are not applicable to detection of defects in carbon fiber materials.

U.S. Pat. No. 9,068,929B2 teaches a SHM system for layered composite structures to detect damage and defects. The capacitive sensing approach relies on insertion of a capacitive layer inside the composite during cure, or permanent attachment to the outside of the structure after cure. Capacitance change is related to structural changes in the composite with time. The requirement for permanent attachment on the outside may cause damage to the material, and the requirement of insertion of the capacitive sensing layer during manufacturing would require re-certification of the entire part manufacturing process.

U.S. Pat. No. 8,928,316B2 teaches a method and apparatus for characterizing composite materials for quality assurance, periodic inspection during useful life, and forensic analysis/materials testing as needed. A change in impedance only is monitor from an excitation coil passed nearby or over the composite material, or composite material in a COPV. This prior art is closest to the current invention. A main difference is our use of an impedance matched RLC circuit together with the excitor coil, and a VNA to monitor changes in the excitor as a function of position over the carbon-fiber or COPV. The improvement in our technique over this prior art is two-fold: First, instead of just impedance, the RLC circuit response of the excitor coil yields change in impedance, reflected power and frequency, all of which we use to improve sensitivity and detection of flaws. Second, since we are able to depth profile by converting our time domain data into the frequency domain, and perform filtering which has the effect of depth profiling the carbon fiber through thickness, layer by layer in the same way as XrayCT.

BRIEF SUMMARY OF THE INVENTION

The main advantage of TDA's approach is the use of a single tuned coil borrowing from magnetic resonance which allows us to simplify the design as well as the data analysis that automatically identifies the detect type (FIG. 1).

TDA's new technology is called electromagnetic-inductive-coupling-analysis (EMICA). This method uses the electromagnetic signature of composite material to locate and identify defects. Our instrument uses a coil with an impedance matching network as both the excitor and receiver to send a signal into the composite and measure how the coil responds to the composite piece. A vector network analysis (VNA) unit excites the coil over a range of RE frequencies and measures the magnitude and phase the response that exits the coil. The response of the coil is determined by interaction with the conducing CFRP material below it. The electrical conductivity in carbon fiber matrix controlled by fiber dispersion (proximity), fiber diameter and fiber length[5]. Any change in the conductive characteristics of the material due to voids, delaminations, matrix cracking or hidden defects will be seen as a shift of the conductivity and the corresponding magnetic field. Even though damage to CFRP is complex, the physical change results in a change in the electrically conducting path which is specific to the damage type incurred. Enhanced sensitivity is required to make these measurements in lower conductivity materials such as CFRP. To design our monitoring system, we draw from fundamental engineering used in nuclear magnetic resonance (NMR) and magnetic resonance imaging (MRI) technologies. Specifically, we use inexpensive, low resistance Litz wire coils tuned to a specific frequency and impedance window to provide this exceptional sensitivity.

An electromagnetic inductive coupling flaw detection device for carbon fiber laminates: comprising, an excitor-detector supplied with alternating current, an impedance matched RLC circuit and a vector-network-analyzer. The device further comprising a display that can show a 2-dimensional or a 3-dimensional representation to indicate a flaw location in a carbon fiber laminate.

A method of detecting a flaw in a carbon fiber laminate using the above device, providing a carbon fiber laminate, using the device to apply an electromagnetic field on the carbon fiber laminate, inducing a response in the electromagnetic field in the carbon fiber laminate, using changes in the electromagnetic field to detect the presence or absence of defects including voids, delamination, cuts, inclusions, compression, or impact damage, and using an impedance matched RLC circuit and a vector-network-analyzer (VNA) to produce a 2-dimensional or a 3-dimensional map of a flaw location in the carbon fiber laminate.

The method further comprising, producing the electromagnetic field (EMF) by the excitor, and reading the response using a second coil or a magnetometer.

The method further comprising, using a frequency of the excitor from 900 Hz to 50 MHz.

The method further comprising, using an excitor circuit which is impedance matched to 50 Ohm using a RLC circuit, the same impedance as the VNA and any amplifiers in between the excitor coil and VNA, to ensure high efficiency power transmission and detection.

The method, wherein the excitor coil may be composed of AWG copper wire or Litz wire, depending on the frequency selection of the 50 Ohm match, to minimize the resistance coming from the excitor coil and thereby increase sensitivity in flaw detection.

The method, wherein the carbon fiber laminate is a laminate panel or a carbon-fiber overwraps of high pressure vessels The method, wherein the thickness of the carbon fiber in the laminate or COPV can range from 0.1 mm to 35 mm The method, further comprising a data collection technique consisting of full rastering of the excitor coil and detection circuit, which may be the excitor coil or a second excitor coil or magnetometer, over the material under test in the same discrete step.

The method, further comprising a data collection technique where sub-sampling is employed, and randomized steps are acquired at a smaller number of points to increase analysis speed.

The method, further comprising a data processing method where in the time and spatial domain data are transformed into the frequency domain by fast-Fourier-transform (FFT), in order to apply high-pass, band-pass, low-pass or other frequency filters to remove specific frequency components.

The method, further comprising, wherein specific frequency components correspond to real physical structure in the carbon fiber, and the effect of filtering in the frequency domain is to peel off spatial depth layers one by one and review flaws at different depths within the thickness of a carbon fiber piece.

DETAILED DISCUSSION OF INVENTION

Figure 1:
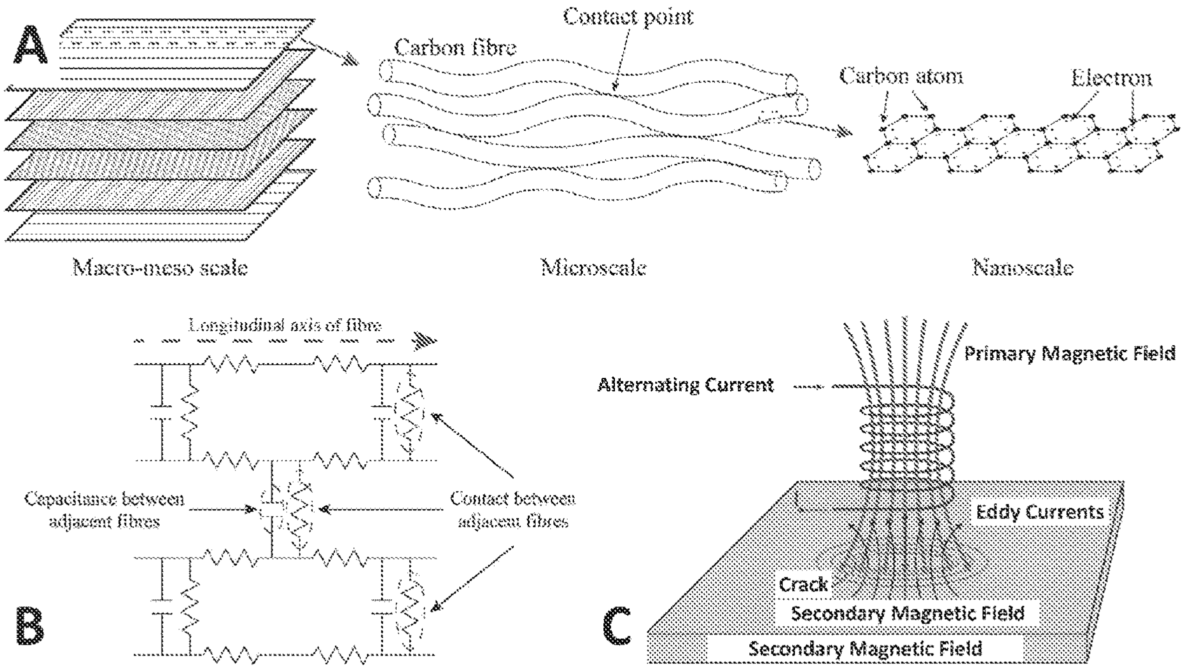
FIG. 1 (A) CFRP bulk conductivity is built up from conductive carbon units at the nano and macroscale. (B) The physical interaction of individual carbon fibers can be treated as a complex electrical circuit, similar to a device-under-test (DUT). (C) When using our highly sensitive spiral coil, the EMICA technique can measure conductivity signatures from the carbon fiber in the CFRP due to the creation of eddy currents FIG. 2. We designed and constructed an automated gantry measurement tool for both laminate and COPV analysis mode. Any sensor can be attached the gantry and used to raster scan over a part. We designed and programmed a custom graphical-user-interface (GUI) in Python for operating the unit from a small laptop. Software inputs include spatial resolution of scan, physical dimensions of object to be scanned, stand-off distance and power into the sensor. The current gantry has an analysis area of 3 $ft^2$, so can accommodate large flat sections of thickness up to 25 mm. In COPV mode, the automation includes scanning across the flat middle sections of the COPV, then rotating the COPV using a pair of rollers beneath the tank and scanning again. In this way the entire COPV is evaluated in an automated fashion, followed by data output to a 3D cylinder or 2D expanded map. (Inset) specially designed low-friction roller head so sensor can move around the curvature of the domed section of the COPV.

The proposed invention is composed of:

(A) A non-contact evaluation method for low or high conductivity materials (B) Detection based on induction of eddy currents in the conducting material (C) Sensitivity in eddy current detection is enhanced, and measurement of lower conductivity materials is allowed, by use of an impedance matching network at a specific frequency (D) Coils tuned to different frequencies can be used to see defects at different depths within a thick (25 mm) carbon fiber side wall (E) Detection is done with a coil which can be spiral or a solenoid or other geometry connected through a 50 Ohm impedance matching circuit to a commercial vector network analyzer (VNA) or reflectometer (F) Detection for on-tank monitoring using an electronics box designed and built at TDA which contains a reflectometer and multiplexer circuit board (G) Custom built TDA electronics unit allows measurement of between 8 and 64 sensors which can be continuously read for real time on tank monitoring for structural health monitoring.

(H) Detection is done by monitoring the four parameters of the VNA S11 measurement, frequency shift, reflected power, imaginary impedance and real impedance (I) Can detect delamination, voids, vertical cracks and changes due to pressurization in carbon fiber laminates or in the carbon fiber liner of the overwrap of pressurized vessels (J) Can be used to analyze overwraps used as the safety wrapping on pressurized cylinders holding hydrogen (H2) or natural gas (NG).

(K) Measurement can tell when a different carbon fiber is present, or when a different lay up of carbon fiber is present, because different carbon fibers or different layups change the conductivity and change the magnitude of the response of the S11 parameters (L) Carbon fiber can be analyzed at a range of thicknesses from 3 mm up to 25 mm for defect detection by changing the operating frequency of the sensor coil.

(M) The S11 parameters which give the most information on defects in the carbon fiber differ as a function of frequency.

(N) At low frequencies and thick samples, the reflected power and real impedance yield the most information.

(O) At high frequencies and thin samples, frequency shift and imaginary impedance give the most information

Definition of Terms

In the specification and the claims the following terms are given their plain meaning and further defined as follows:

The term "RLC" means a circuit whose combination of resistance (R), capacitance (C), and inductance (L) combine to produce a specific frequency of operation (resonant frequency)

The term "S11" means the input reflection coefficient with the output of the network terminated by a load matched to 50 Ohms.

The term "S21" means the forward transmission from port 2 delivered to port 1 in a network analyzer.

The term "VNA" means vector-network-analyzer, an instrument that measured the magnitude and phase of an input signal at a single frequency.

The term "reflected power" means a portion of the transmitted power which is not coupled into the material under test and is returned back to the VNA.

EXAMPLES

Figure 2:
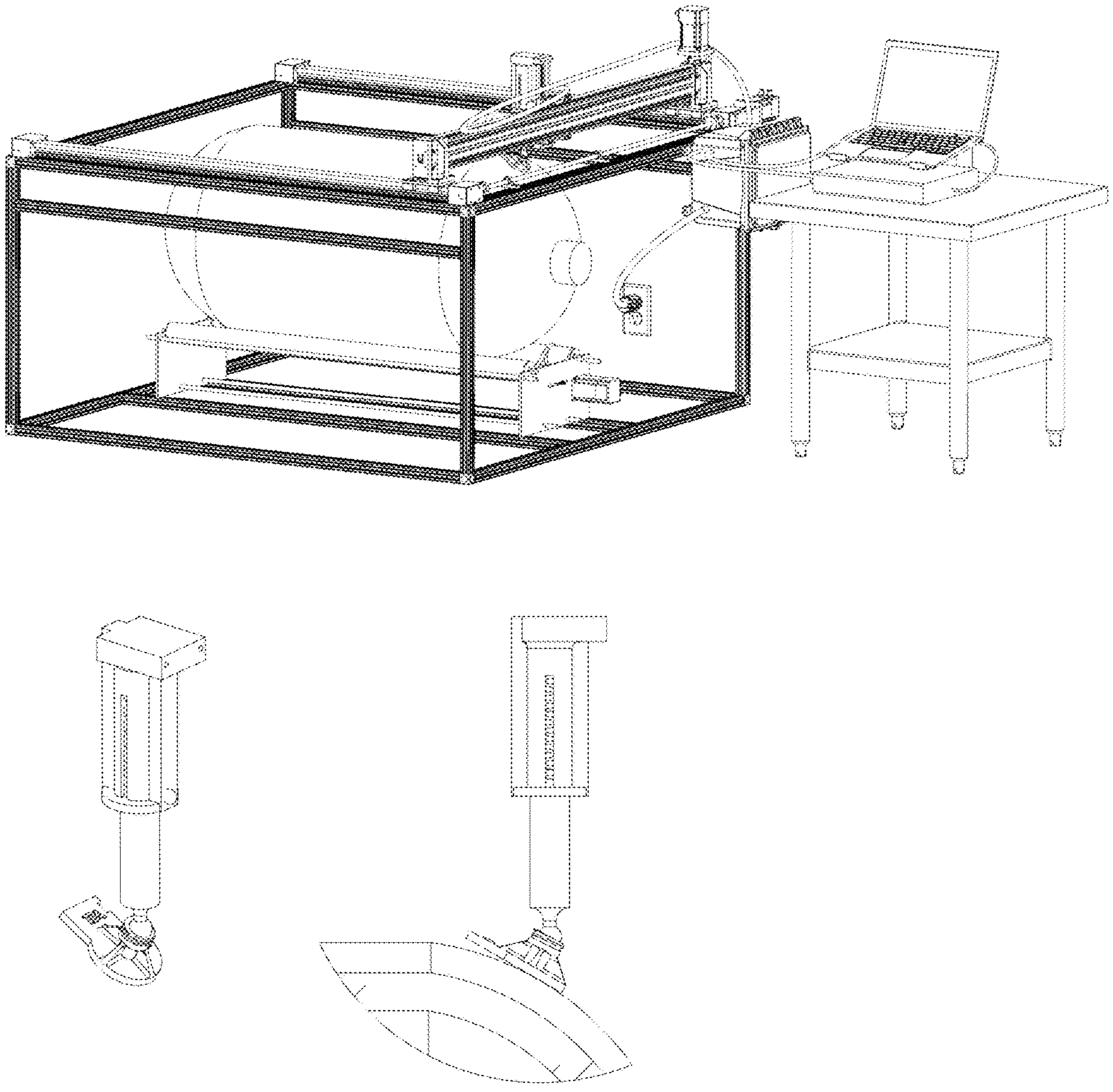
Figure 3:
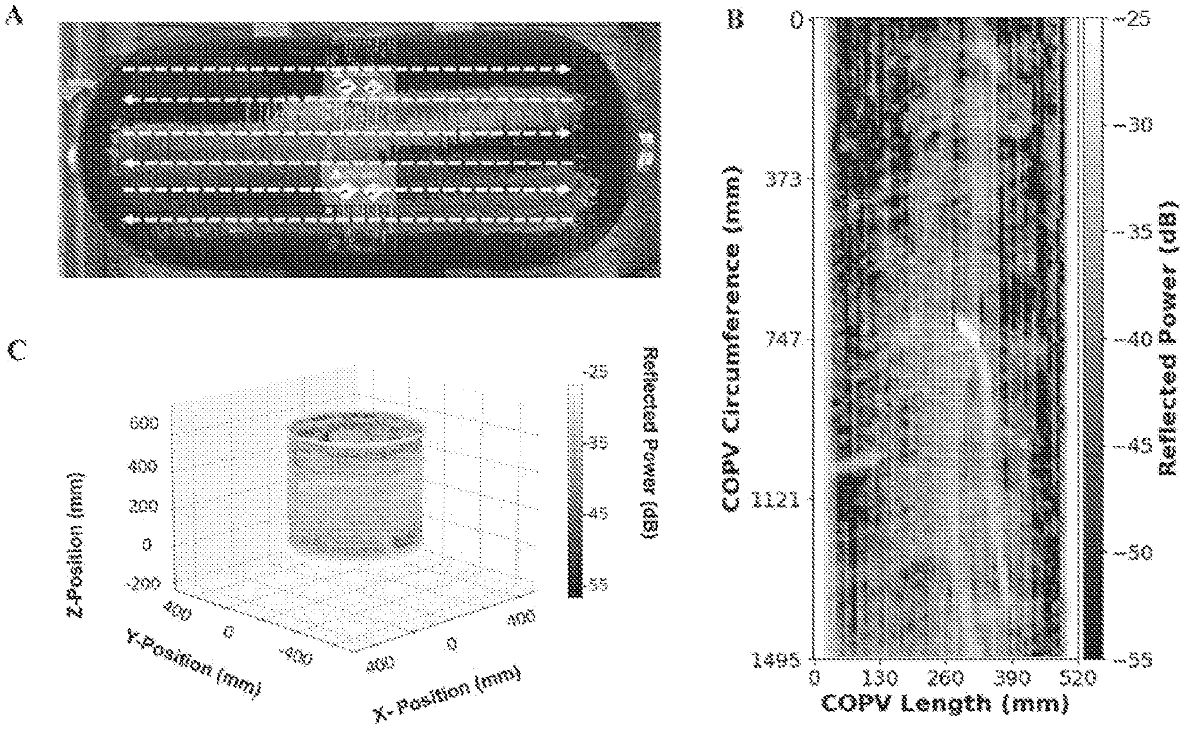
FIG. 3. TDA's EMICA technology developed in Phase I and Phase II work. (A) Full COPV are scanned to create a (B) 3D damage map. (C) The damage map can also be "unfurled" into a 2D map for easier inspection. Darker areas represent healthier carbon-fiber, while yellow and red areas indicate defects or abnormalities in the carbon fiber beneath the sensor.

Example 1. EMICA in Fully Automated Laboratory-Based Measurement for Thick-Walled COPV In one example, the sensor is incorporated into a fully automated measurement using a gantry programmed for 3-axis (X,Y,Z) movement so the sensor can be moved in discrete amounts on a COPV (FIG. 2). The COPV is mapped and a 2D damage map of the 3D structure is produced (FIG. 3).

Figure 4:
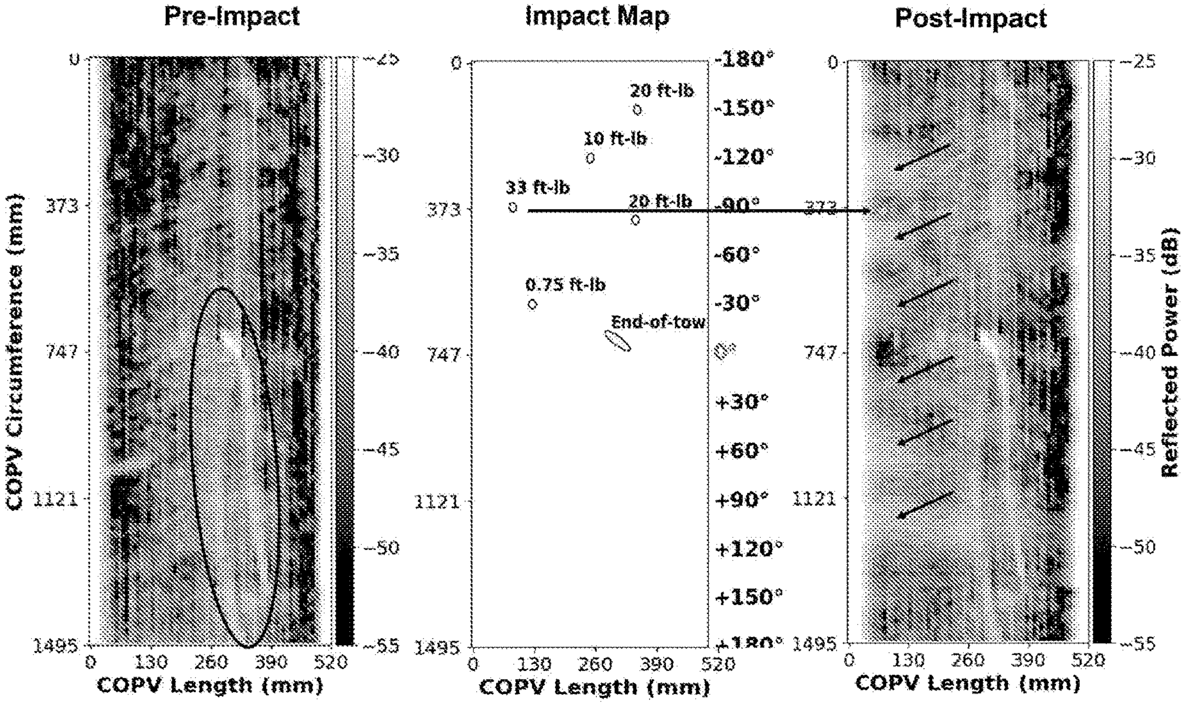
FIG. 4 Demonstration of damage detection on full COPV using EMICA. The 3D cylinder is unwrapped to a 2D map. The x-axis is COPV length, and the y-axis is the tank circumference. (Left) The pre-impact map indicates healthy carbon fiber on one side (top half) of the tank. (Middle) An impact map shows the placement of different impact energies. (Right) The post-impact map shows a change in EMICA signal not just at the 33 ft*lb (44.7 N*m) impact site, but also spreading out from the impact site along the circumference of the tank.

The EMICA scan captures the native structural health state of the COPV, but also can capture additional damage due to impact. A 90 L 700 bar tank with 25 mm composite thickness was scanned for a baseline measurement first, and then taken to the manufacturer Steelhead for impact damage in accordance with ISO 11119-2. Steelhead uses a special impact device which narrows to a ½" diameter point to maximize impact damage per unit area. Impacts of 0.75, 10, 20 and 33 ft*lb (1, 13.5, 27.1 and 44.7 N*m) were delivered at various spots on one side of the tank, as shown in the damage map in. Even before impacting, the "healthy" COPV had a flawed fiber-tow termination which was visible at the surface, but which the EMICA scan indicated went further around the tank that visual inspection did. We interpreted this as damage going down into the thickness of the carbon fiber. EMICA scans of the full 90 L COPV are shown before and after the impact forces were delivered (FIG. 4). The side of the tank with the defective tow-preg termination (bottom of the unwrapped tank scan) is indicated by the straight black line and is the same in both pre- and post-scans, consistent with no new damage being delivered in that area. The areas on the other side of the tank, indicated at the top of the rolled out tank scan are in much better condition (i.e. much more negative reflected power values) in the pre-impact scan. Post impact the largest difference is observed at the 33 ft*lb (44.7 N*m) site. There is an increase in the reflected power (reflected power is less negative) near the site of the impact, but also damage emanating outwards from the impact site which seems to move around the circumference of the tank at the end where the damage was imparted.

Figure 5:
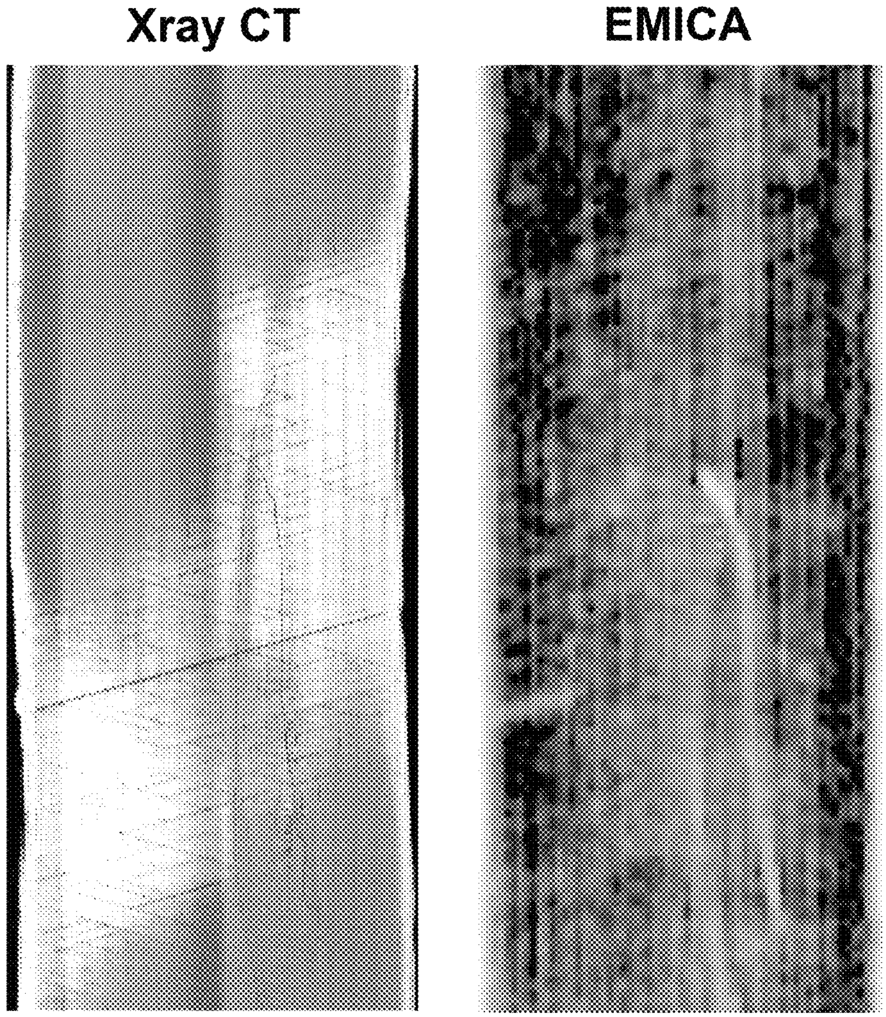
FIG. 5 The EMICA technique can detect some of the same discontinuities as XrayCT in the same full COPV scanned by each. The XrayCT slice is ~5 mm into the carbon-fiber wall thickness of 25 mm. This is the general depth the EMICA is reporting on also.
Figure 6:
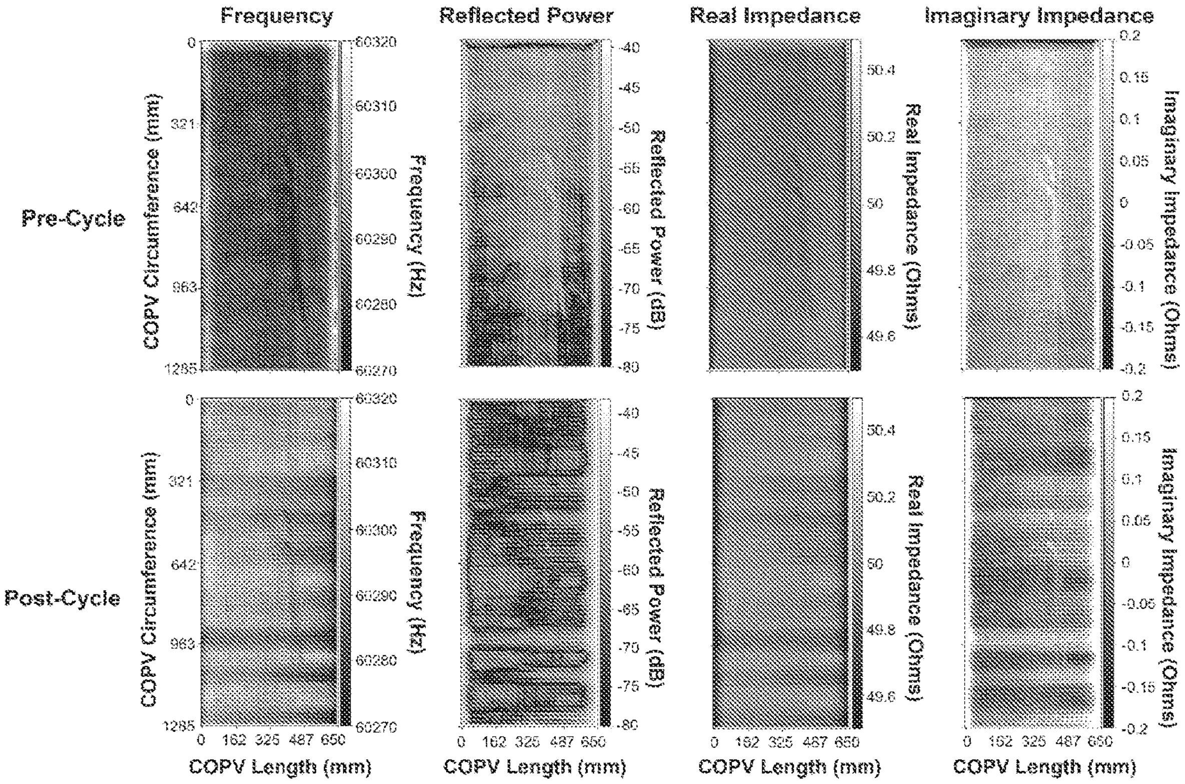
FIG. 6 The EMICA technique is used to detect changes in 25 mm carbon fiber wall of a full COPV after light pressure cycling. The COPV was scanned as received from manufacturer and analyzed with EMICA. Afterwards the tank was cycled from 0 to 5000 psi for 500 cycles and rescanned. EMICA analysis detects a "banding" pattern after the 500 cycle test across all four $S_{11}$ parameters.

Comparison has been made between EMICA and X-ray-CT for the same tank, prior to impact. Unwrapping layers of the XrayCT data shows three large defects being detected by EMICA on one side of the COPV which correlate well with Xray CT (FIG. 5). Two vertical tow-preg defects are highlighted in green and red in the XrayCT data. The clearer vertical damage in EMICA corresponds to damage closer to the surface (and sensor). The damage indicated by the green line is approximately 5 mm into the carbon fiber wall. A diagonal horizontal damage down the length of the tank (across the 2D image) is seen clearly at one end of the tank (left side) but disappears towards the other end in the EMICA scan. A larger, red area on the color map corresponds with multiple small voids between tow-wraps observed in the XrayCT.

The EMICA technique is used to detect changes in 25 mm carbon fiber wall of a full COPV after light pressure cycling. The COPV was scanned as received from manufacturer and analyzed with EMICA. Afterwards the tank was cycled from 0 to 5000 psi for 500 cycles and rescanned. EMICA analysis detects a "banding" pattern after the 500 cycle test across all four $S_{11}$ parameters: frequency, reflected power, resistance (real impedance) and reactance (imaginary impedance).

Figure 7:
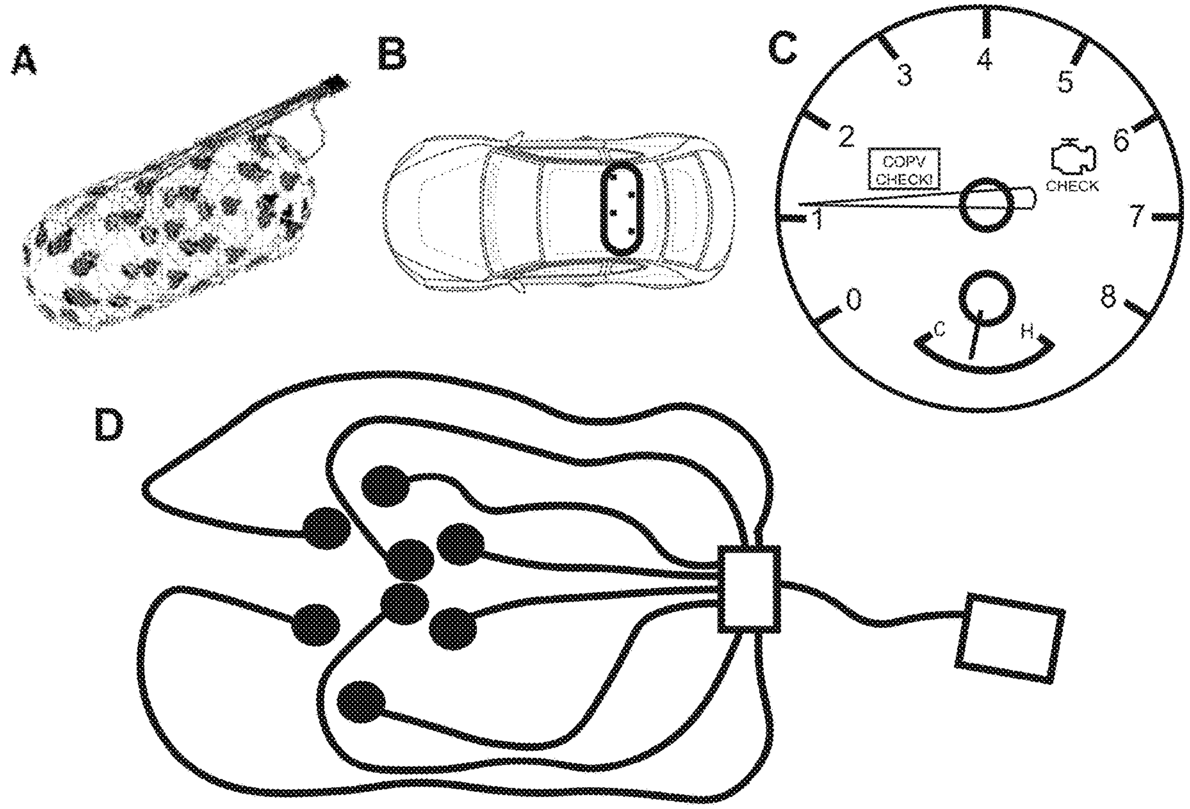
FIG. 7. (A) An array of low-profile, inexpensive sensors provide feedback on the health of the COPV storing $H_2$ for the FCEV. (B) The array and electronics are streamlined to fit around the tank inside the tight space constraints of a vehicle. (C) Sensor information is routed to the car's on-board computer, which can alert the driver when tank maintenance or inspection is needed. (D) 8-EMICA sensors connected to a multiplexer board and reflectometer are the bases of the sensing and monitoring electronics for the on-tank form factor.

Example 2. On Tank Monitoring Array Comprised of EMICA Sensors and Custom Measurement Device In a second example, the sensor is incorporated into an array wrapped tightly around a COPV in use in automotive or heavy vehicle to monitor for tank damage over the lifetime of use or after an accident (FIG. 7).

Figure 8:
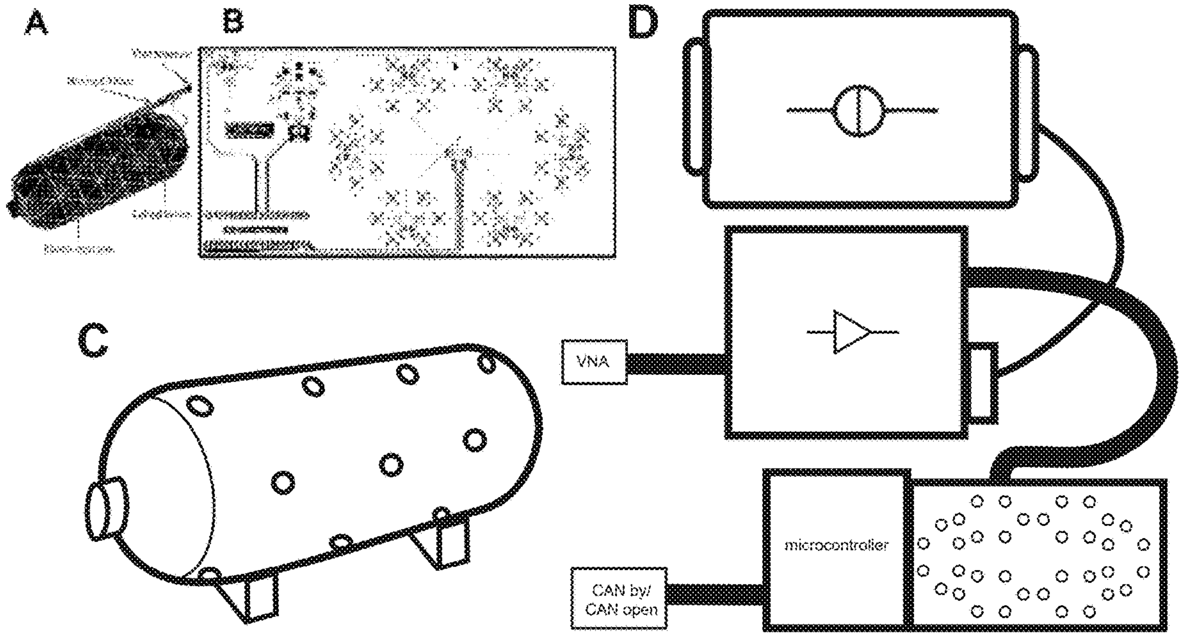
FIG. 8 (A, B) Close up of the in-house made TDA reflectometer and multiplexer electronics on a single board. This approach is an enabling technology for the on-board measurement. (C) Several EMICA sensors mounted onto a 90 L Type III COPV with 25 mm thick carbon fiber wall. (D) Full assembly of the in house reflectometer and multiplexer board, along with a RF amplifier used to increase the sensitivity of EMICA to detect flaws.

For structural health monitoring, the tank sensor array must conform to the tank shape, remain secure, and be easily connected to the vehicles computer system or other computer reader for standalone gas storage use. Initially we thought we would need multiple VNA units to read out sensors around the entire tank, but we have found a single multiplexer unit and VNA can handle up to 36 sensors. Furthermore, we identified a benefit in making the measurement at higher powers into the sensor. In order to exert better control over the allowed power levels, we designed and have nearly completed our own in-house VNA (a reflectometer). This has also allowed us to design the VNA and multiplexer electronics onto a single electronics card, which further reduces the space requirements for the electronics monitoring on tank in a vehicle (FIG. 8).

Example 3. EMICA Analysis of CF Coupons of Thin Laminate Samples and Cylinder Sections Shows Several Different Damage Types Several standard laboratory samples, or calibration objects, have been made and characterized with EMICA to establish the "ground truth" of the measurement.

Figure 9:
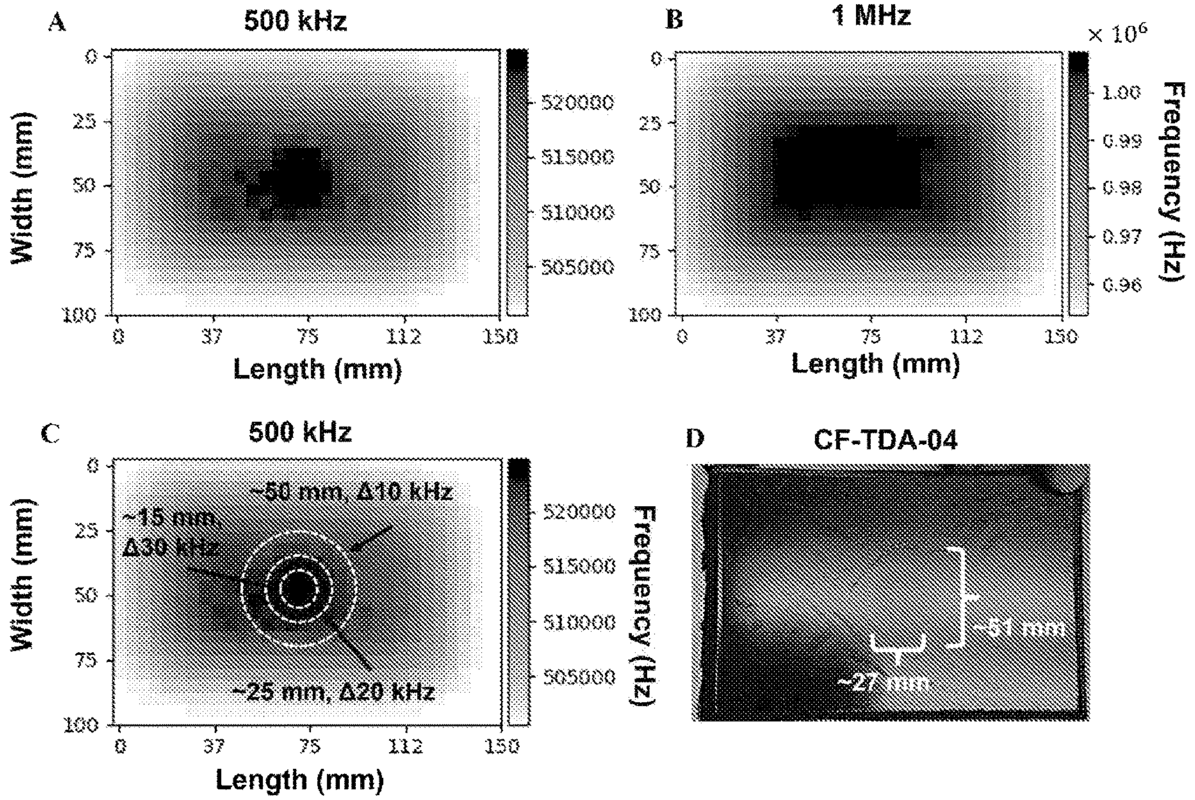
FIG. 9 The defect in TDA-CF-04 was made so large visible inspection of induced damage could be used to sort through different experiment parameters like frequency or B-field amplitude. (A) 500 kHz scan (B) 1 MHz scan. (C) The size of the defects picked up in the 500 kHz scan match primary and secondary damage to the panel observed with visual inspection (D).

A panel 6" long×4" wide×¼" thick was manufactured at TDA and analyzed at with EMICA sensors at operating frequencies of 500 kHz or 1 MHz (FIG. 9). The alternating stack of nineteen 127 μm thick PTFE delaminations is detected at each frequency. However, the 500 kHz scan penetrates the piece more readily than the 1 MHz and captures two damage types which are corroborated with visual inspection. The first damage type is ~25 mm in diameter and represents the diameter of the PTFE delams. The secondary damage to the laminate is generated by the distortion the PTFE inserts make to the larger carbon fiber structure and is ~ 50 mm in diameter. The damage detected by the 1 MHz coil is very near the average of these two damage types (~34 mm). Both damage types are detected by the 500 kHz coil, due in part to the deeper penetration of the lower frequency EMF which put a higher B-field amplitude at the defect which could be distorted and present information on the defect physical parameters.

Figure 10:
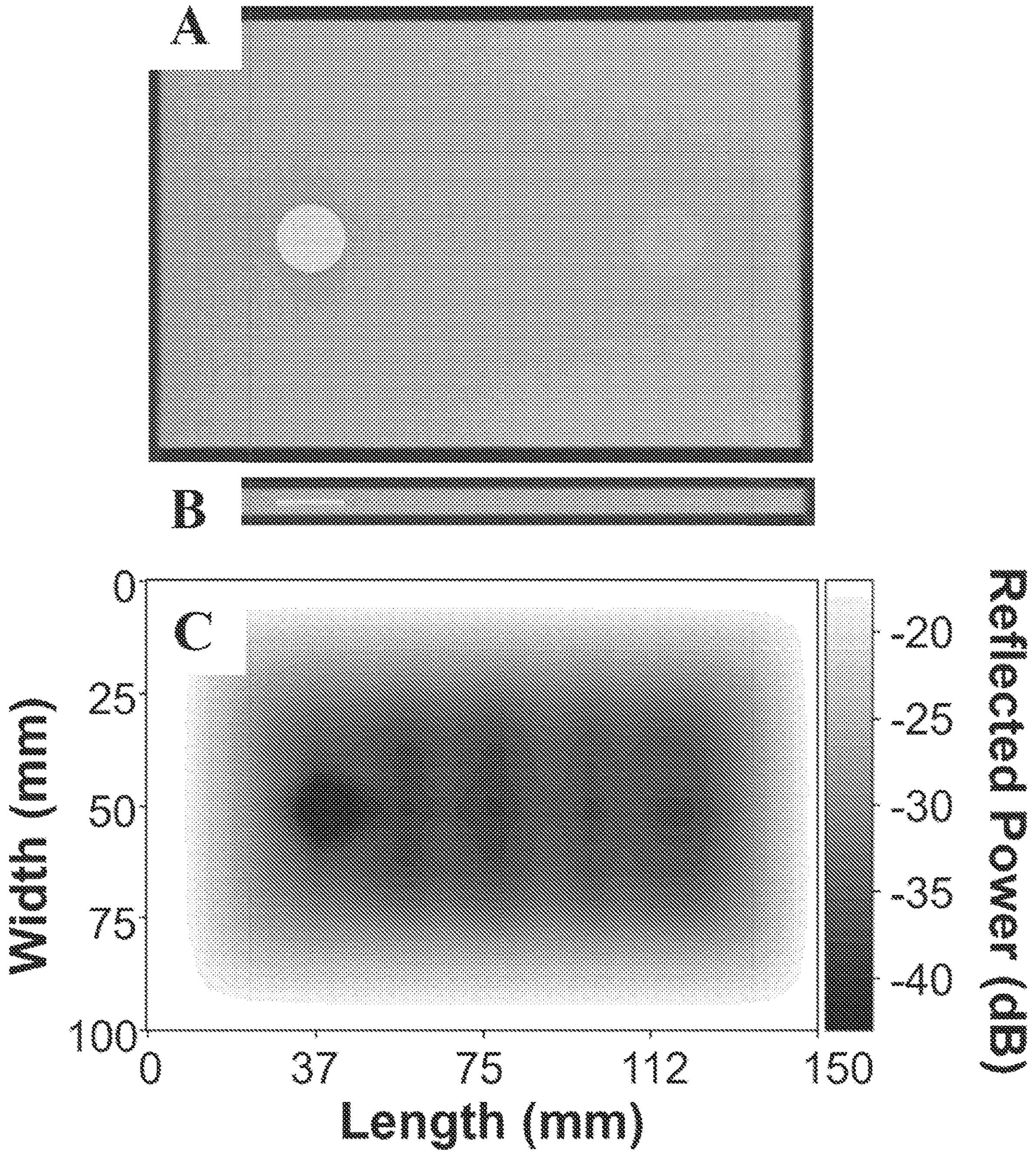
FIG. 10 (A) Xray CT, horizontal slice of TDA-03 provided by LM-MFC through center of panel. (B) Xray CT, Vertical slice through panel center. (C) EMICA scan of TDA-03 recorded at TDA. For both EMICA and Xray CT, the 1 mm thick spacer comes through much more clearly, and the 0.127 mm delamination is barely visible.
Figure 11:
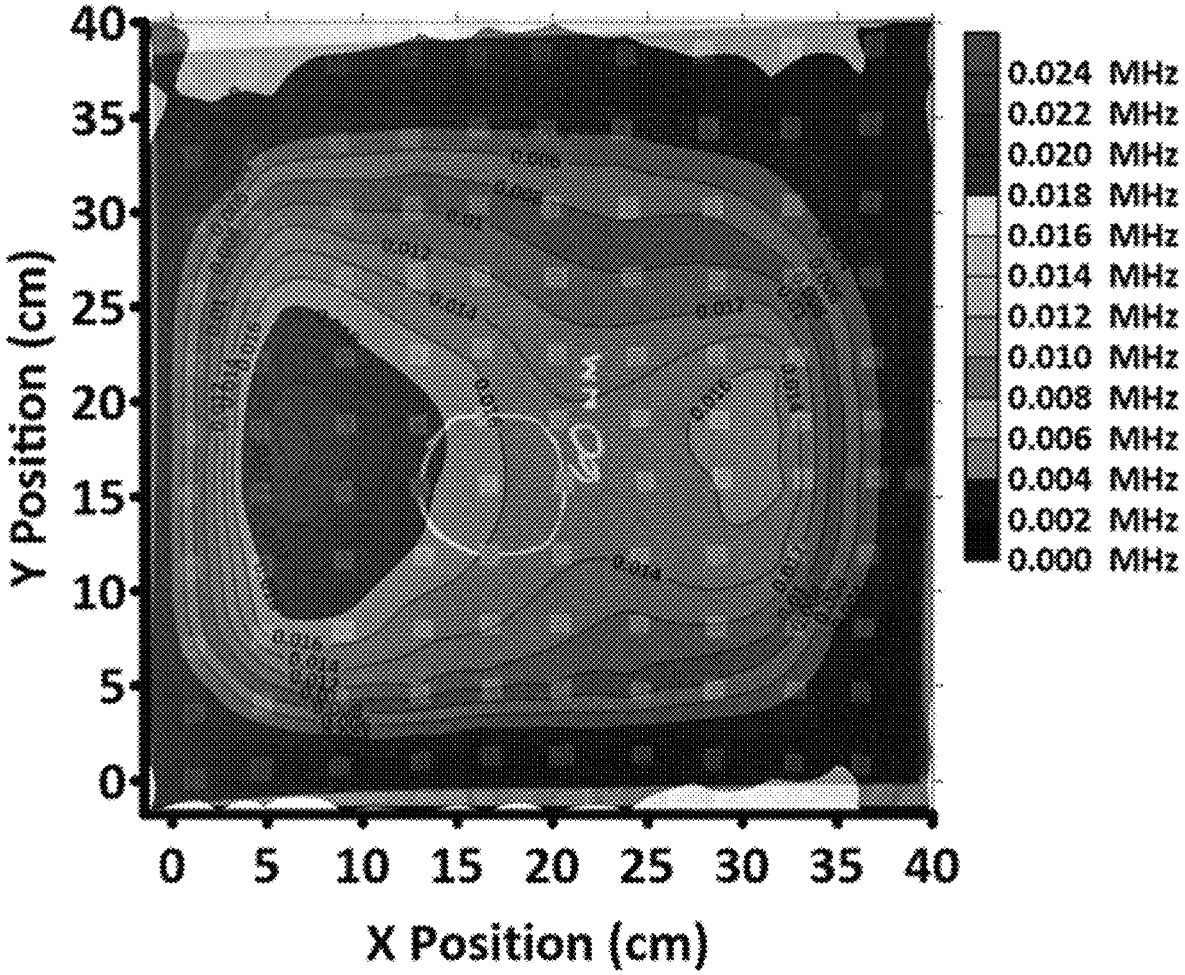
FIG. 11 The EMICA scan of a large carbon fiber panel with a thickness of 3 mm, overlaid with a picture of the panel. The panel was damaged in the center with an impact force of 60 N*m. Frequency shift data from the $S_{11}$ measurement using the EMICA sensor show changes to the carbon fiber laminate to the left and right of the impact point in a "peanut shell" pattern.

A second panel was manufactured, with only a single delamination inserted on either side of the panel. In one case the delamination was 1 mm thick, and in the other case the delamination was 0.127 mm thick. In both cases the delaminations were 25 mm in diameter. Comparison with Xray CT shows EMICA is clearly picking up the larger delamination (FIG. 10). Neither delamination is apparent from visible inspection. Detection of the smaller delamination is improved in EMICA by using a smaller diameter sensor coil.

Impact damage has a characteristic EMICA signal different from delaminations. A large, thin carbon-fiber laminate ~3 mm thick was produced by Steelhead composites and included a slight warp after cure. A calibrated weight was dropped into the middle of the panel with a force of 60 N*m generated on impact. No damage is visible visually. The EMICA scan shows large frequency shifts to the left and right of the impact site, in a "peanut shell" pattern. This pattern is in line with current understanding of impact driven delamination between layers in thin carbon fiber laminates.

Figure 12:
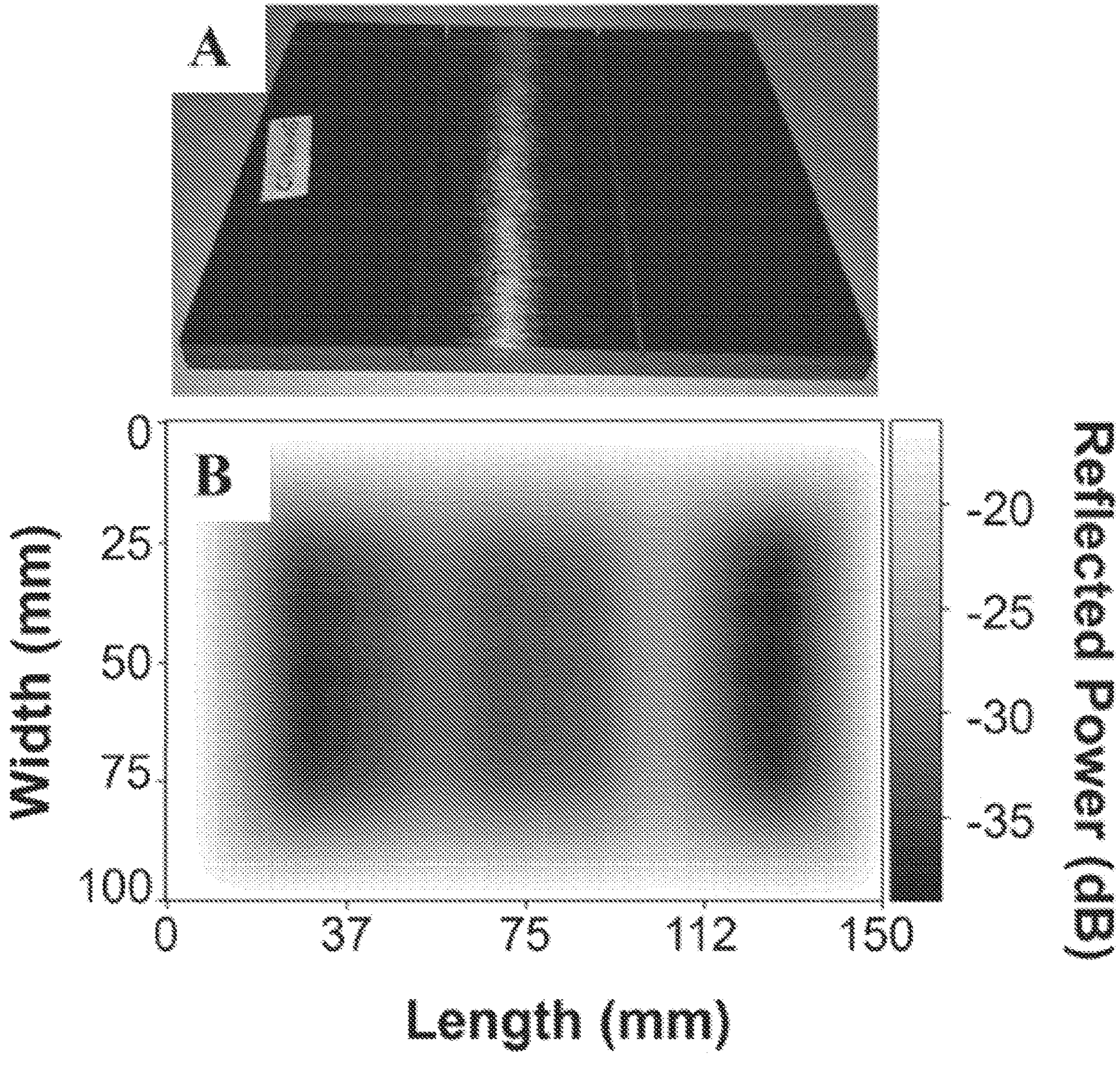
FIG. 12 Vertical cut damage detected by EMICA inside a 6 mm thick carbon fiber laminate. (A) The carbon fiber laminate panel with vertical cut damage. (B) EMICA scan detecting the 3 mm and 1.5 mm deep cuts. The panel was oriented, so the cuts were on the bottom, and the EMICA coil was placed on top of the panel, analyzing through the carbon fiber to detect the cuts. The 3 mm cut signal dominates a side-by-side display.
Figure 13:
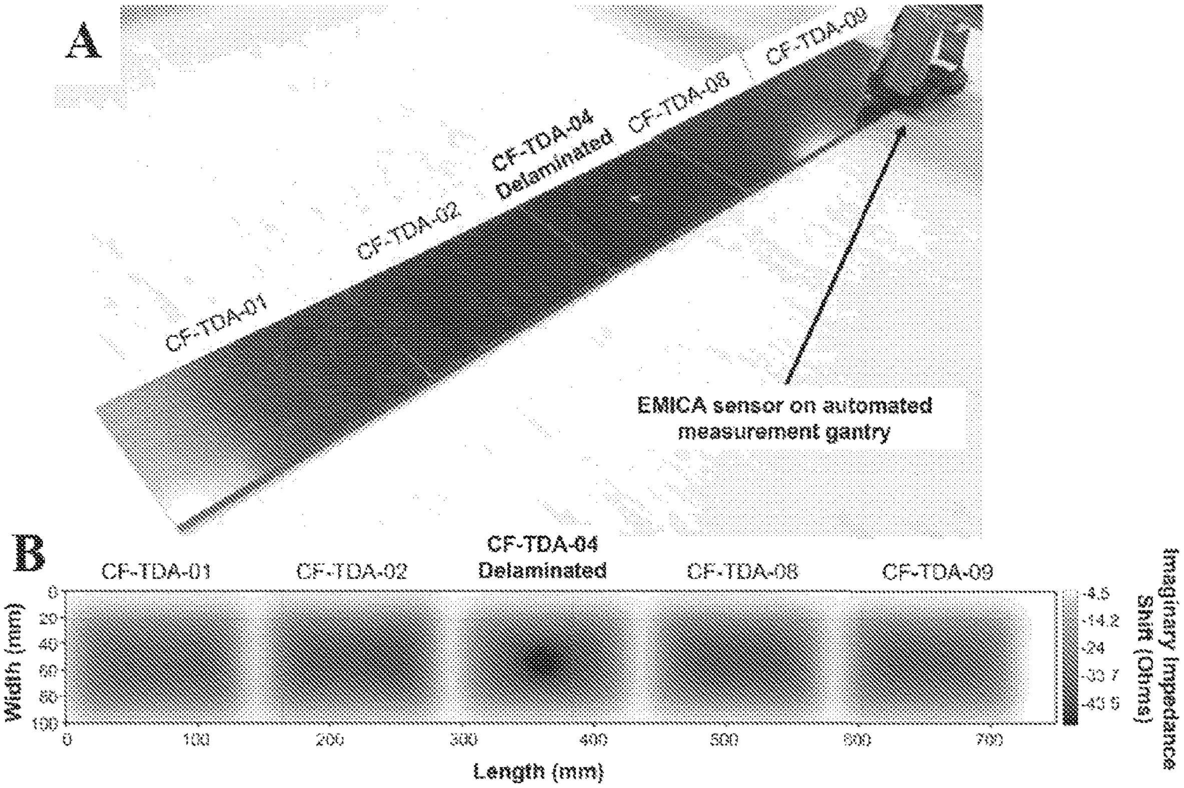
FIG. 13 EMICA scan of major delamination defect panel (TDA-04) surrounded by healthy carbon fiber laminate panels. (A) The large defect in TDA-04 are less pronounced with visual inspection, but clearly visible in the EMICA analysis (B). Each panel is pressed as close to the next panel as possible, but the separation between panels comes through clearly in the EMICA scan as well.

Vertical cut damage was demonstrated within a panel (FIG. 12), and between panels (FIG. 13). As with traditional eddy current testing, the lowest limit of detection is for vertical cracks. In the case of the vertical separation between several healthy panels, with one defective panel "hidden" in the middle, EMICA clearly sees the separation between the panels (even though they are pushed together) and the severe delamination within the "defective" panel.

Figure 14:
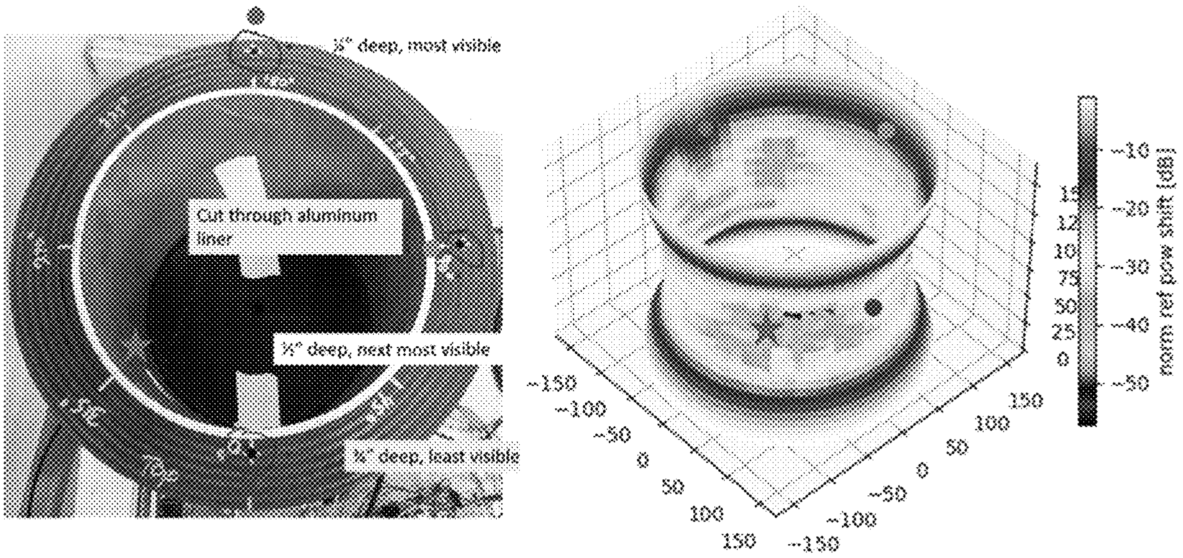
FIG. 14. Use of the cylindrical test section of 25 mm carbon fiber overwrap to determine penetration depth. A frequency of 60 kHz was used to interrogate the cylinder. Various injury types, including three holes drilled in the side wall and a gouge cut through the liner and into the carbon fiber from the underside, are visible in the EMICA scan.

We established the best operating frequency for analysis within a carbon fiber wall ~25 mm thick by analyzing a thick-walled carbon-fiber overwrapped cylinder section. Our goal was to learn which frequency best drives the electromagnetic through the 12 mm of carbon fiber. Ultimately, we settled on a 60 kHz operating frequency. Three of the damage types were holes drilled in the side wall of the overwrap to simulate separation at different depths within the carbon-fiber overwrap. Each hole was drilled with a ⅛" diameter bit drilled 2.5" (63.5 mm) deep into the wall. The holes were placed at increasing depths from the surface of the overwrap, at intervals of ½" (6.35 mm), ½" (12.7 mm) and ½" (19.05 mm). The second damage type was a cut through the aluminum liner into the carbon fiber from the underside of the overwrap. A Dremmel tool was used to cut a hemispherical hole through the liner (⅛" or 3.175 mm thick) and a further 3.825 mm into the carbon fiber. We were able to see all four of these defects, as seen in (FIG. 14). The strongest signal comes from the shallowest hole in the wall (marked with a blue circle) and the gouge from inside the cylinder through the aluminum liner and into the underside of the carbon fiber. The drill hole at ½" (12.7 mm) is indicated with the blue dot. The drill hole at ¾" into the carbon fiber wall is barely detectable but can still be seen.

Figure 15:
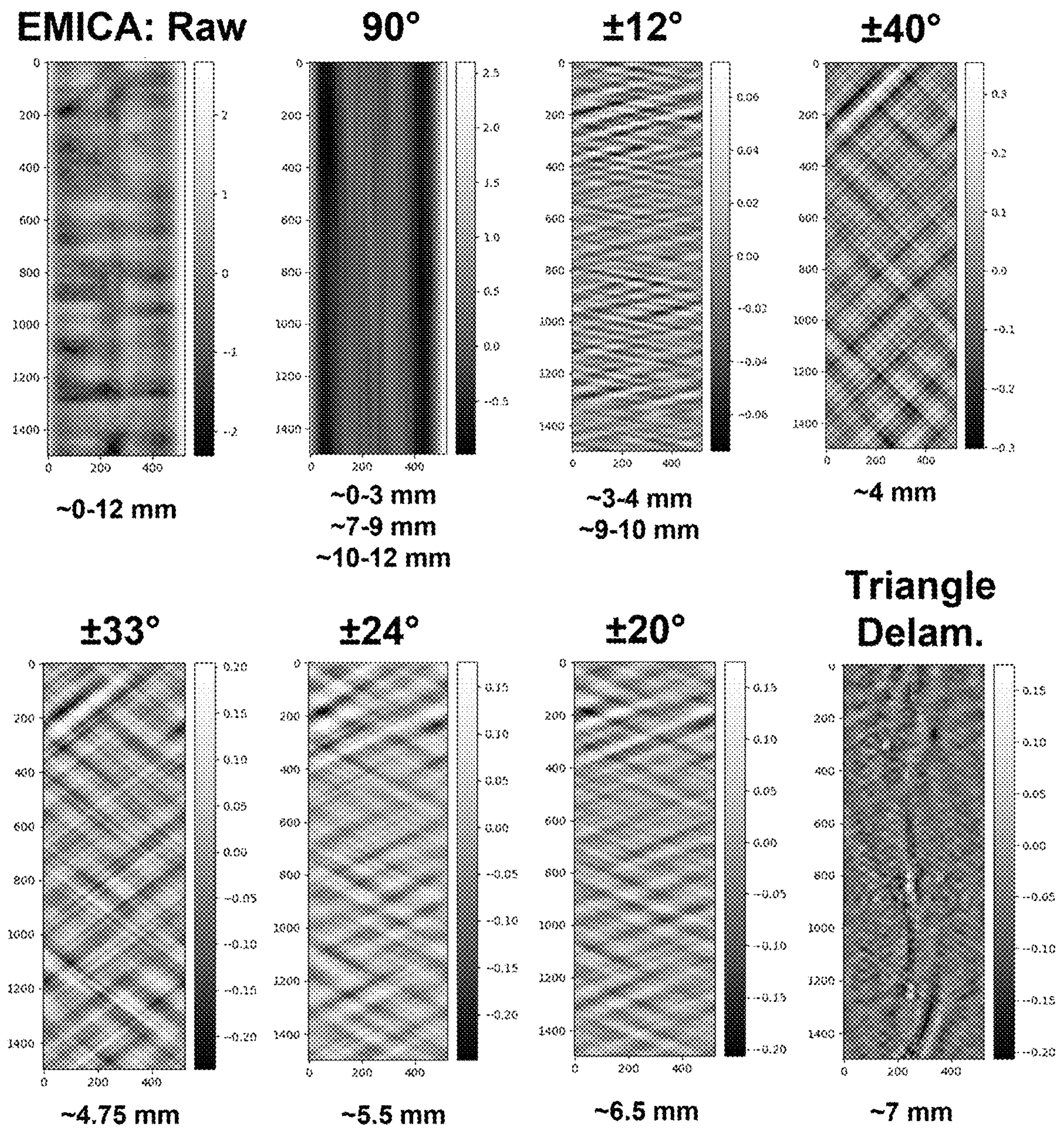
FIG. 15. Example of using 2D-FFT decomposition for a 40 kHz EMICA raw image data (reflected power) in the 2D frequency domain to achieve depth profiling through the thickness of the tank. Individual and independent layers were shown to be isolated using this technique to a depth of 12 mm into the COPV.

Example 4. EMICA Depth Profiling of Layered CF Structures can be Achieved Via Layer-by-Layer 2D-FFT Image Decomposition EMICA depth profiling (i.e. spatially resolved imaging in the CF thickness direction) of layered CF structures is achieved by 2D-FFT decomposition of the raw signal based on the known ply layup of the structure. Because layered CF structures have different ply angles as a function of depth for achieving desired mechanical properties, all multi-angle layered CF structures can be depth profiled in rapid time-frames via EMICA imaging with 2D-FFT decomposition. A raw reflected power EMICA image of a Type IV COPV with ~30 mm thick CF overwrap was taken at 40 kHz with a 5 mm raster step size and each distinct ply angle was extracted based on the manufacturers ply layup table to a depth of ~12 mm from the surface (FIG. 15). 2D-FFT decomposition was achieved using binary masks to retain specific ply angles and spatial frequencies while removing all other contributions to the image. EMICA depth profiling imaging was successfully demonstrated for 6 distinct ply angles and one known implanted delamination for depths of ~1-12 mm into the thickness of the CF overwrap COPV (FIG. 15).

Figure 16:
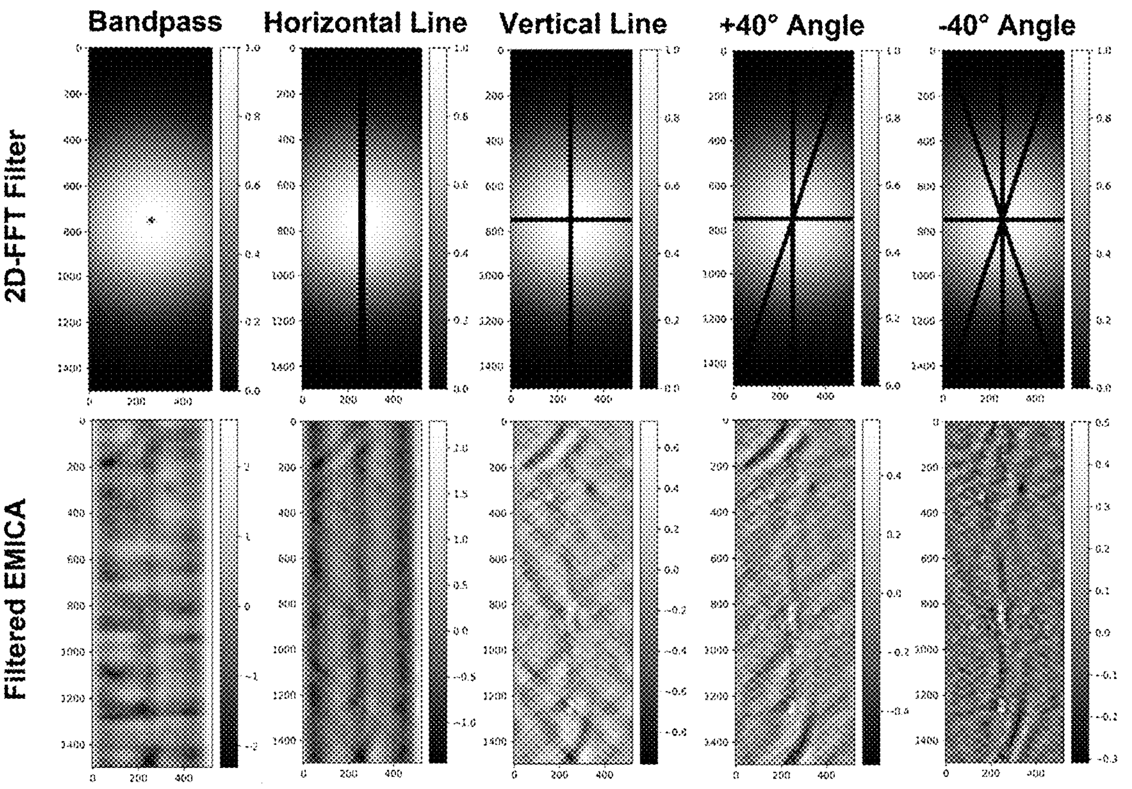
FIG. 16 Example of sequentially filtering the 40 kHz EMICA raw image data (reflected power) in the 2D frequency domain via binary masking. A bandpass filter removes background and high frequency noise from the image. The horizontal line filter removes the measurement scan line contributions. The vertical line filter removes the edge effect and the 90° hoop wraps. The two angle line filters remove the very prominent ±40° windings, thus revealing the implanted PTFE triangle shaped delamination.

Example 5. EMICA Images can be Filtered Using Binary Masks in the 2D Spatial Frequency Domain to Remove or Isolate Desired Structural Features When a raw spatial image (EMICA map) is represented in the 2D spatial frequency domain via a 2D fast Fourier transform (2D-FFT), the resulting image can be filtered via binary masks for decomposition of the original raw image into its individual spatial features. Furthermore, because the COPVs being scanned have known ply layup angles, angular filtering can be performed to remove each winding layer's contribution from the raw image. A raw reflected power EMICA image taken at 40 kHz with a 5 mm raster step size was sequentially filtered (i.e. each new filter is a combination of the previous filters plus an additional one) using binary masks after a 2D-FFT is applied. The binary masks relating to bandpass, horizontal/vertical line, and ±40° angular filtering are shown with their corresponding filtered images obtained via an inverse 2D-FFT (FIG. 16).

Example 6. EMICA Shows Changes to Defects in CF Structures for Both S21 (Transmission) and S11 (Reflection) Measurement Modes When EMICA is performed on CF structures in either S11 (reflection) or S21 (transmission) measurement mode, the raw signal characteristically changes based on the defect type present, in comparison to healthy CF. Analysis using both measurement modalities were completed using 100T-Litz solenoids with ~16 mm OD. Both CF panels were 4" wide×6" long×¼" thick Unitape with [0°/90°] layup pattern. One panel had two PTFE delaminations (1 mm and 0.127 mm thick) implanted equidistant from each other and the panel edges. The other panel had two different cuts (1.5 mm and 3 mm deep) made using a Dremmel tool implanted equidistant from each other and the panel edges.

Figure 17:
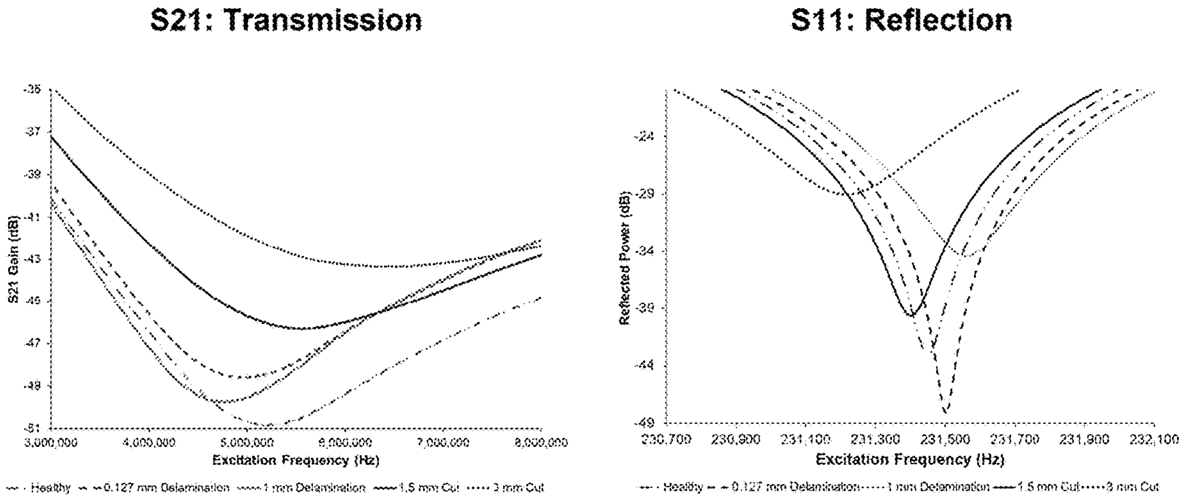
FIG. 17 Both EMICA modalities (S21: transmission and S11: reflection) provide raw signal differences that are characteristic of internal defects within CF structures. Here the samples were both ¼" thick Unitape with [0°/90°] layup pattern. One CF panel had two delaminations (1 mm and 0.127 mm thick) and the other panel had two cuts (3 mm and 1.5 mm deep) in them.

For the S21 analysis, the two coils were both untuned, with the transmit coil placed on top of the feature being measured (from the healthy side of the panel) and a frequency sweep from 3 MHz to 8 MHz is shown in FIG. 17. There are clear shifts in the resonant frequency (minimum of the curves) and the S21 Gain (dB) which are distinct for the cuts vs delaminations vs healthy CF. For the S11 analysis, a single coil is used which is resonant tuned via an external capacitance board to 231.5 kHz and the coil is placed directly on top of the CF feature being measured (again from the healthy side so no defects are visible). The S11 EMICA plots also show distinct shifts in the resonant frequency and the S11 reflected power (dB) which are characteristic of the CF structure and whether defects are present. Delaminations shift the resonant frequency toward higher values and cuts shift it to lower frequencies from the healthy CF.

Example 7. EMICA Imaging can Identify Damage Through 25 mm of CF Using S11, S21, and S21 with Principal Component Analysis Measurement Modes We established the best operating frequency for analysis within a carbon fiber wall ~25 mm thick by analyzing a thick-walled carbon-fiber overwrapped cylinder section. Our goal was to learn which frequency best drives the electromagnetic through the 12 mm of carbon fiber. Ultimately, we settled on a 60 kHz operating frequency. Three of the damage types were holes drilled in the side wall of the overwrap to simulate separation at different depths within the carbon-fiber overwrap. Each hole was drilled with a ⅛" diameter bit drilled 2.5" (63.5 mm) deep into the wall. The holes were placed at increasing depths from the surface of the overwrap, at intervals of ¼" (6.35 mm), ½" (12.7 mm) and ¾" (19.05 mm). The second damage type was a cut through the aluminum liner into the carbon fiber from the underside of the overwrap. A Dremmel tool was used to cut a hemispherical hole through the liner (⅛" or 3.175 mm thick) and a further 3.825 mm into the carbon fiber. We were able to see all four of these defects, as seen in (FIG. 18) using S11 (reflection) and S21 (transmission) measurement modes.

Figure 18:
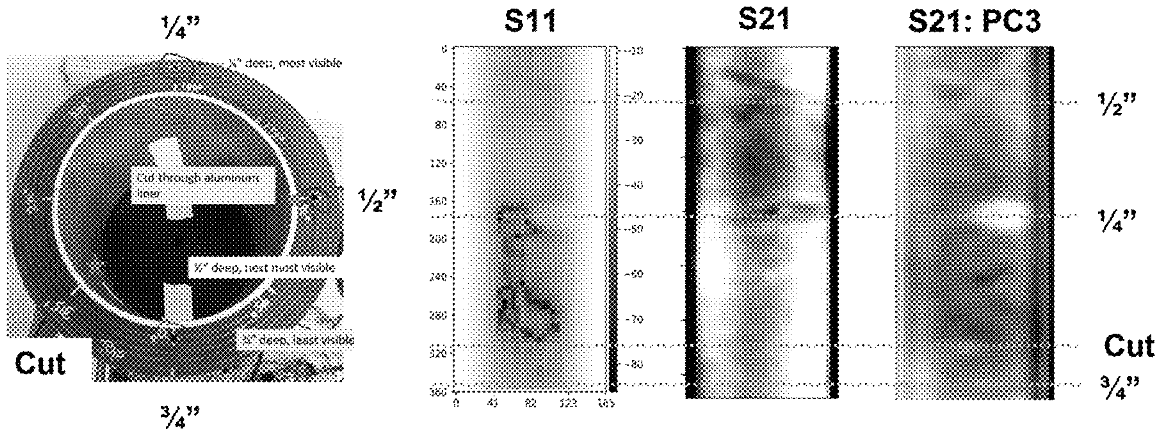
FIG. 18 Use of the cylindrical test section of ~25 mm carbon fiber overwrap to determine penetration depth. A frequency of 60 kHz was used to interrogate the cylinder. Various injury types, including three holes drilled in the side wall and a gouge cut through the liner and into the carbon fiber from the underside, are visible in the EMICA images using S11, S21 or combined S21 and PCA measurement modes.

A new EMICA imaging mode was also demonstrated on this cylinder coupon using principal component analysis (PCA). PCA can reduce a large multivariate dataset into significantly less variables which represent that many original variables. Here, we ran PCA on the entire set of S21 frequency sweep data that was collected and then selected only principal component 3 (PC3) for plotting as a function of spatial location. The S21: PC3 EMICA image in FIG. 18 shows high resolution detection of all three holes and the aluminum liner cut which shows that using EMICA combined with PCA imaging on CF layered structures can provide similar or better capabilities than an single variable S11 or S21 measurement approach. Nonetheless, in all plots, the strongest signal comes from the shallowest hole in the wall and the gouge from inside the cylinder through the aluminum liner and into the underside of the carbon fiber.

Example 8. The Presence of an Aluminum Backer Improves the Depth Sensitivity of EMICA in Layered CF Structures When EMICA is used to image layered CF structures that have an aluminum backing plate located opposite from the excitation coil, such as Type III COPVs which have an aluminum inner liner, the high conductivity of the metal in relation to the much lower CF conductivity has a dramatic improvement on the sensitivity at depth. When our primary magnetic field from the EMICA solenoid interacts with a high conductivity backing material (such as aluminum), it generates a higher density of eddy currents along the conductive material's XY surface plane (perpendicular to the solenoid's excitation magnetic field), in comparison to the deepest eddy current loops in the layered CF panel.

Figure 19:
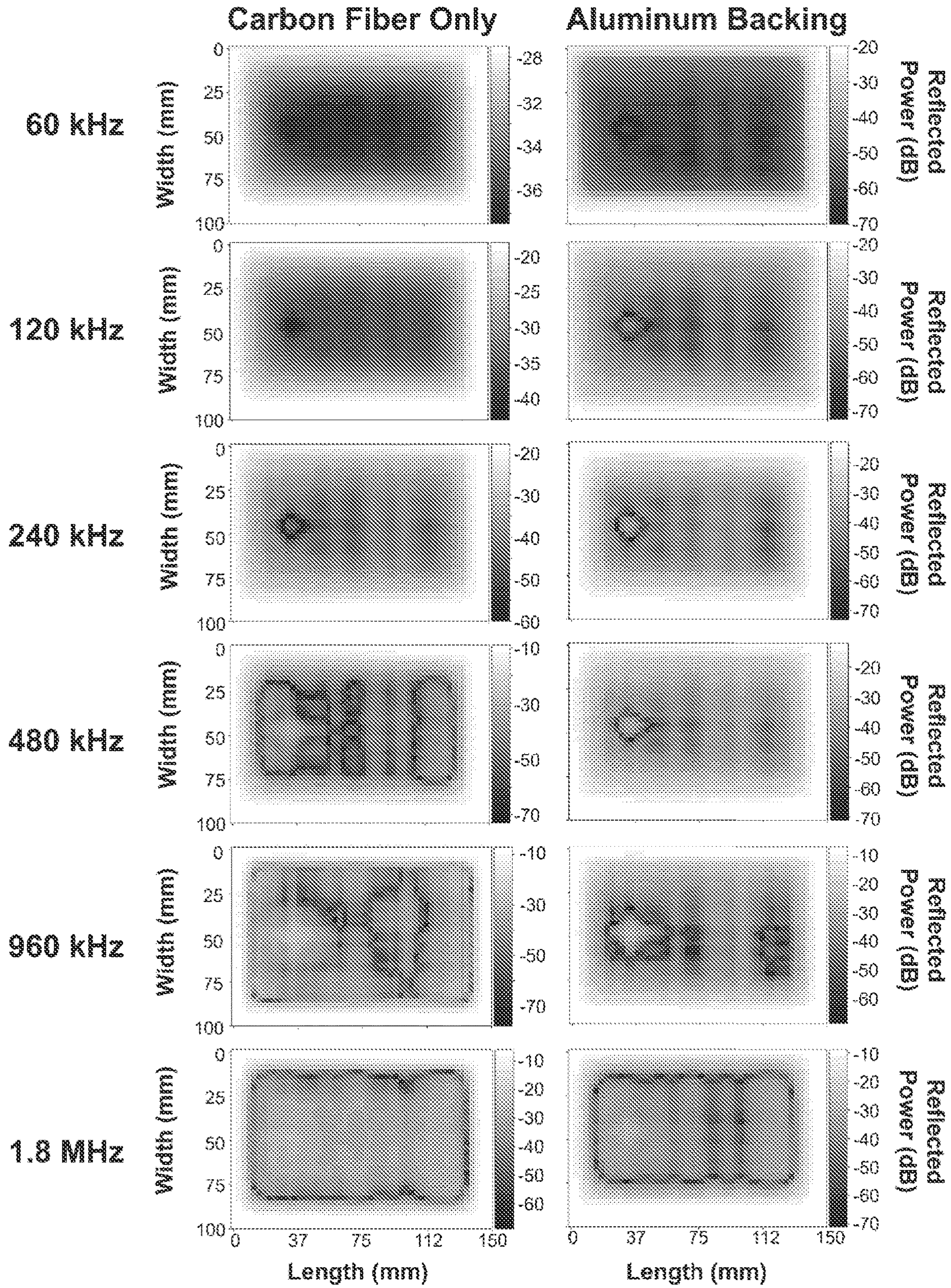
FIG. 19. Effect of the presence of an aluminum backing plate placed underneath the ~6 mm thick [0°/90°] Unitape flat panel that has two PTFE delaminations embedded at 3 mm in depth. The sensitivity at depth for EMICA is increased when the aluminum backing plate is present.

Here we performed a frequency sweep (measured from the top) on a with and without a ¼" aluminum plate underneath. A distinct trend is observed when comparing EMICA maps with and without the aluminum backing at the same frequencies (FIG. 19). The edge effect (transition from CF to air) is less pronounced when the aluminum backing is added at 60 kHz. This is due to the high conductivity of the aluminum plate, which interacts strongly with the EM field and focuses the field through the CF. This effect is less apparent as the frequency increases but is further corroborated by comparison of the 240 kHz EMICA map without aluminum and the 480 kHz EMICA map with the aluminum backing. These two maps are extremely close in terms of S/N, contrast, and the detection of the two delaminations. As the frequency is increased, the depth of penetration is known to increase if everything else stays constant (e.g. material under test, coil, etc.), which indicates that the aluminum backing is helping the EM field to focus deeper into the material and thus similar penetration depths are achieved, albeit at different frequencies. Moreover, when the aluminum backing plate is present, the detection of the delaminations is similar across all frequencies up to 960 kHz, but it is significantly different in the non-aluminum backed CF maps. This indicates that the EM field is interacting strongly with the aluminum backing at all frequencies tested and is further corroboration of the focusing effect.

In this case, the high conductivity of the aluminum prevents resistive losses and thus the conversion efficiency from the magnetic field is much higher. These strong eddy currents in the aluminum are then associated with an intense secondary magnetic field that reaches back up through the CF plate from the bottom. This effect essentially would allow the aluminum liner to act like an additional low power excitation coil and again the secondary magnetic field generated by the eddy currents in the aluminum is strong enough to generate secondary, tertiary, etc. eddy currents within the CF which propagate back up in a layer-by-layer nature towards the primary excitation coil. In essence, we are probing the CF structure from the top-down and then reinforcing the field from the bottom-up (note this is simultaneously occurring) when a metallic backing plate for flat panels, or metallic liner in the case of the COPV's, is present. This allows a significantly higher sensitivity to defects at depth when using EMICA.

Figure 20:
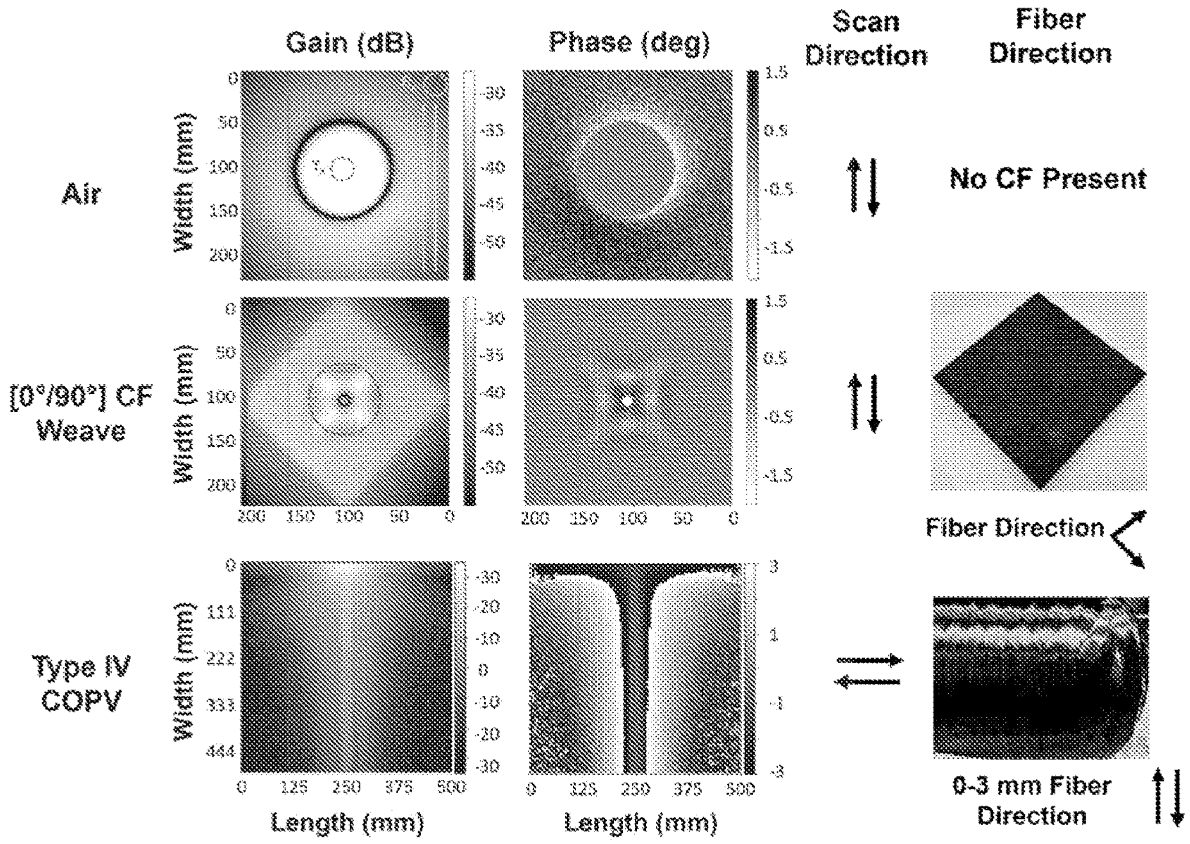
FIG. 20 Electromagnetic field (EMF) spread in CF structures with different ply angle layup sequences on a flat panel and COPV tank form vs in air with no CF present. The EMF preferentially transmits along the fiber direction regardless of scan direction and is attenuated more in the transverse directions, while also decaying beyond the edges of the CF panel.

Example 9. When EMICA is Used to Inductively Probe CF, the Electromagnetic Field Spreads Through Interaction with the Internal Structure and is Preferentially Transmitted Along the Fiber Direction When an electromagnetic field (EMF) interacts with CF structures via EMICA, the CF acts as an in-situ sensor that distorts and spreads the primary field based on its characteristic structure. The shape of this field spread is affected primarily by the fiber orientation of each layer but is also influenced by the resin matrix, CF grade, excitation frequency used, etc. First, we measured the EMF decay as a function of distance from the solenoid, via S21 (transmission) measurements in air at 3.03 MHz (FIG. 20). Two identical untuned coils (16 mm OD 100-turn Litz wire solenoids) were used for the transmit ($T_x$) and receive ($R_x$). The $T_x$ coil was kept stationary, and the $R_x$ coil was scanned over the top using an automated gantry with a spatial encoder. When the coils are directly on top of each other, the distance between them was set at 12.7 mm for comparison of how the field shape/amplitude changes from air to when interacting with layered CF structures. When the S21 gain magnitude (dB) decreases (becomes more negative), this shows that the amplitude of the Z-axis magnetic field is decaying. Although we are not directly measuring magnetic field flux, the S21 gain magnitude directly reflects changes in the amplitude (or direction) of the primary magnetic field from the $T_X$ coil.

The S21 magnitude (dB) map in FIG. 20 shows an extremely well-defined circle of high transmission (>−30 dB) that extends ~35 mm from the center radially. At the edge of this circle, there is a sharp transition region where significantly lower transmission is observed that only extends a few millimeters before observing the gradient decay again. The same sharp transition is observed in the Phase map with an abrupt phase change of a few degrees. When making the same measurement through the thickness of a healthy ½" thick T700s 2×2 Twill Weave CF panel having [0°/90°] symmetric balanced layup, the field is warped with higher transmission and less of a phase shift observed over a longer distance when the coils are aligned in the fiber directions. This isn't an artifact of the measurement since the panel was rotated 450 and the scan lines do not correspond to the same direction as the fibers. When the S21 maps are compared between air and the CF weave (FIG. 20), the high transmission region in air (dashed circle) has expanded along the fiber direction and contracts in-between.

When the $T_x$ coil is placed on a Type IV COPV having ~30 mm CF thickness and many different distinct ply angles as a function of depth, the EMF spreads preferentially along the 90° hoop angles (top to bottom of image, FIG. 20) which are located from 0-3 mm in depth from the surface. The reason the deeper ply angles are not observed is due to the high excitation frequency used (3.03 MHz) which has a shallow skin depth and thus only interacts with the first few layers in depth. This further corroborates the fact that the CF preferentially spreads the EMF along its higher conductivity fiber directions, for each layer it interacts with in depth.

Example 10. Using EMICA in S21 Measurement Mode and Principal Component Analysis Clustering Allows Unsupervised Classification of CF Type and Ply Angle Layup When EMICA is performed on CF structures in S21 (transmission) measurement mode, the type of CF structure and ply angular layup can be identified and classified via principal component analysis (PCA). PCA is a data dimensionality reduction method that can also be used as an unsupervised classification technique via clustering approaches. Furthermore, PCA can be used to identify the most important frequencies for making these classifications when an S21 measurement approach is used since it contains information about many excitation frequencies in comparison to our typical S11 (reflection) approach.

Figure 21:
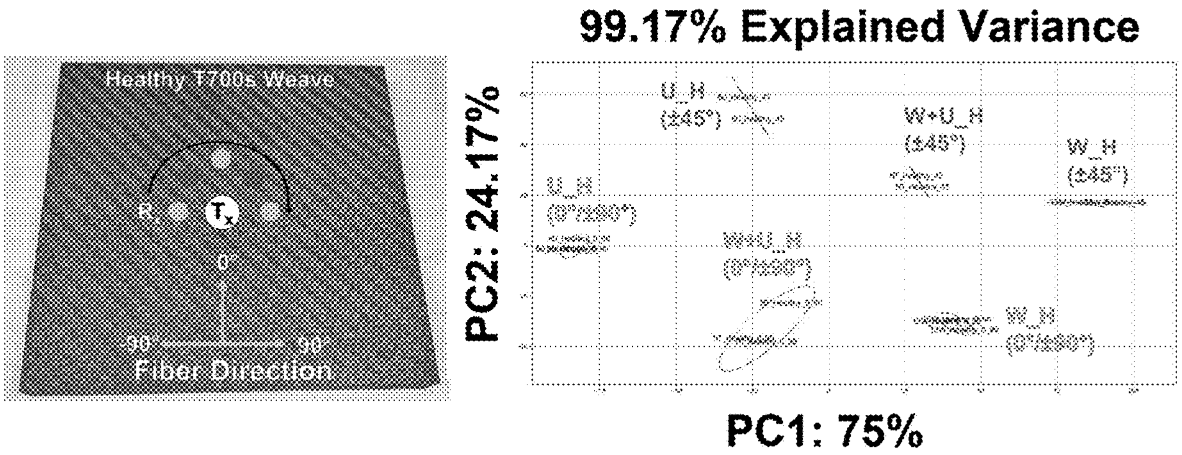
FIG. 21 PCA cluster differentiation of CF type and ply angle layup for three different "healthy" CF panels. W_H is a healthy ½" thick [0°/90°] layup made with 2×2 twill weave prepreg. W+U_H is a healthy ½" thick [0°/90°] layup made with Unitape prepreg and an additional single layer on top and bottom of 2×2 twill weave prepreg. U_H is a healthy ¼" thick [0°/90°] layup made with Unitape prepreg. Clear differentiation is seen for panel type and coil detection angle using 3-standard deviation confidence ellipses.

Here, EMICA was used in S21 measurement mode to monitor three different types of healthy CF panels at different coil detection angles (−90°, −45°, 0°, 45°, 90°, FIG. 21). By choosing different CF panel types, we can see which frequencies provide the most information to classify them across multiple variations in CF layup such as epoxy resin type, void-content, thickness, and grade of CF. Also, because the conductivity is significantly higher along the fiber direction than any other dimension, S21 measurements show higher transmission in these directions and PCA can rapidly classify the layup fiber direction. The three panel types chosen were a 12.7 mm thick 2×2 twill weave with [0°/90°] layup (W_H), 6 mm thick Unitape with [0°/90°]] layup (U_H), and a 12.7 mm thick Unitape panel with [0°/90°]] layup sandwiched between two 2×2 twill weave plies (W+U_H). A 100-turn Litz solenoid with an OD of ~16 mm was used for both the transmit ($T_x$) and the receive ($R_x$) probe.

PCA analysis was performed on each measurement's corresponding S21 frequency sweep from 100 Hz to 30 MHz (16,501 total data points), and the first 2 principal components, (representing 99.17% of the total variance from the original dataset), for each measurement were plotted against each other (FIG. 21). FIG. 21 shows accurate classification of the three panel types and the fiber layup angle at 3 standard deviations (99.73% confidence interval shown by ellipses/lines). For future automated analysis, any unknown measurement that falls within this known sample cluster area could be automatically characterized without a trained operator.

Example 11. The True Penetration Depth of an Electromagnetic Wave in Layered CF Structures does not Follow the Standard Skin Depth Equation The traditional standard depth of penetration for a plane wave is defined as the depth in a material where the eddy current density decreases to 1/e (~37%) of the surface density and is given by the following equation;

$$\delta = \frac{1}{\sqrt{\pi f \mu \sigma}} \quad 1$$

where δ is the penetration depth (m), f is the excitation frequency (Hz), μ is the magnetic permeability (H/m) of the material, and a is the electrical conductivity (S/m) of the material. Equation (1) was developed for homogeneous, high conductivity materials (like Al-metal), and assumes a perpendicularly incident plane wave with perfectly orthogonal electric (E-field) and magnetic (B-field) field components. Perfect separation of the E-field and B-field only occurs when the transmitter (our coil in this case) is very far away from the material (at least 2), where X is the wavelength in meters of the coil operating frequency). In fact, for our EMICA analysis the coil has almost no separation from the CF, which puts us in the much more complicated near-field RF regime. Consider also that CF is not homogeneous, and the anisotropy in its conduction paths is directly related to the type of CF used and the lay-up angles. In fact, the surface density of eddy currents can be >10× lower than that of the first ply interface in [0°/90°] layup structures which directly contradicts the theory of strict exponential decay from the surface, as the standard penetration depth equation represents.

Figure 22:
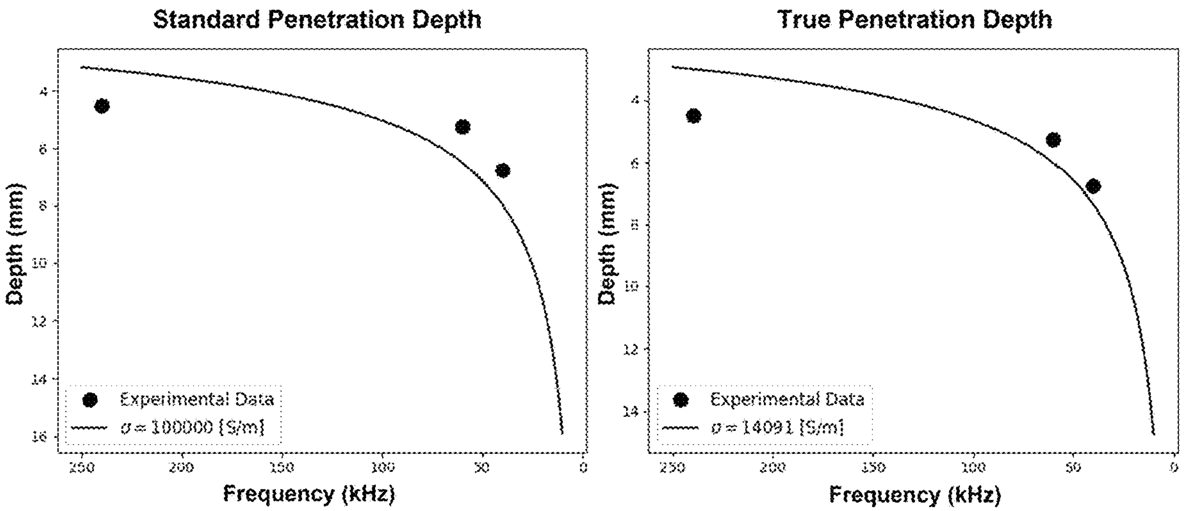
FIG. 22 New equation to relate detection depth of EMICA to the excitation frequency based on the structural geometry of the layered CF. The standard penetration depth equation fits at a value of 100,000 S/m which is higher than the conductivity of a single fiber along its length and is thus impossible. The new true penetration depth equation fits at a value of 14,091 S/m which agrees with literature.

Additionally, a real coil emits a spherical wavefront and the true penetration depth changes with excitation frequency, magnetic permeability, electrical conductivity, sample thickness, coil dimensions, and liftoff distance. The coil dimensions and liftoff distance only affect the penetration depth due to the non-planar nature of the EM wavefront, which in turn is simply a result of spatial power delivery efficiency from the coil to the material under test based on the magnetic field shape. FIG. 22 shows experimentally measured features at depth in a Type IV COPV in relation to the frequency that was used for detection. Fitting Equation 1 to the experimentally obtained data gives a bulk conductivity value of ~100,000 S/m, which is impossible since the conductivity of a single fiber (along the fiber direction) is ~60,000 S/m and the bulk conductivity cannot be higher than this value. Thus, the standard penetration depth described by Equation (1) cannot be used to model EM penetration and eddy current generation using real coils and does not consider the complexity of CF layered 3D structures (e.g. ply angular differences, conductivity anisotropy, contact resistance, etc.).

Since layered CF structures are not well understood systems, and modelling approaches are highly time-consuming, we expanded this equation to relate to CF wrapped cylinders using parameters that can be experimentally obtained or known prior to measurement (Equation 2).

$$\delta_T = \frac{\gamma}{\sqrt{\pi f \mu \sigma}} \times \prod \left[\frac{1}{\beta r}\right]_\alpha \quad 2$$

Here, $\delta_T$ is the true penetration depth, $\gamma$ is the wavefront correction factor to account for the deviation of the wavefront from a planar wave, a is the interface number starting at 1, $\beta$ is the ratio of the ply angles at the interface to 90°, r is the ratio of the conductivity between the Z-plane (through-thickness) to the fiber direction. This new equation accounts for the amplitude lost due to the wavefront error by $\gamma$ prior to interacting with the material under test and $$\prod\left[\frac{1}{\beta r}\right]_{\alpha}$$

accounts for the EM amplitude change at each interface, not strictly due to exponentially decaying skin effects. This equation can be used to predict the detection depth of EMICA based on the excitation frequency and geometry for any layered CF structure. We validated this new equation by fitting the values to the same experimental data as shown in FIG. 22 and obtain a bulk conductivity value of ~14,091 S/m, which agrees with values published in literature.

Figure 23:
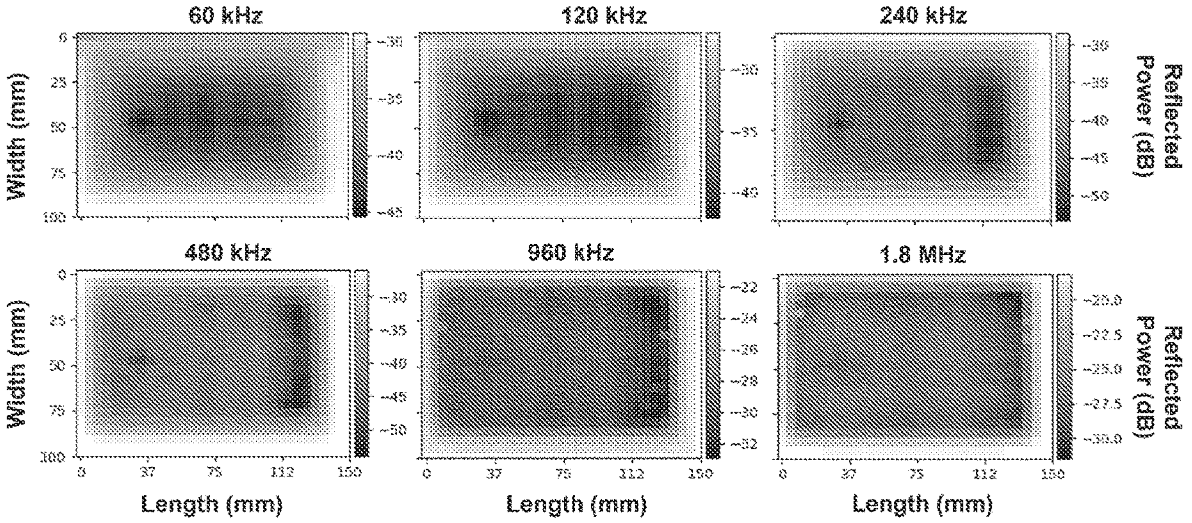
FIG. 23. Excitation frequency to depth study on ~6 mm thick [0°/90°] Unitape flat panel shows that as the frequency is decreased, the magnetic focal point moves deeper in the thickness of the CF and is ~3 mm between 120 kHz and 240 kHz FIG. 24. Depths of ply angles and the triangle delamination in the Type IV COPV FIG. 25. Excitation frequency to depth study on Type IV COPV shows that as the frequency is decreased, the magnetic focal point moves deeper in the depth of the tank CF overwrap and is ~0-3 mm at 240 kHz and ~9.75-12 mm at 25 kHz.

Example 12. The Excitation Frequency Used for EMICA is Directly Related to the Detection Depth in CF Structures The frequency of the EMICA excitation wave is directly related to the penetration depth and limit-of-detection (LOD) in terms of depth in CF structures. The lower the excitation frequency is the deeper the magnetic field will penetrate through the thickness of CF structures. A flat Unitape CF panel (6" long×4" wide×¼" thick) with two implanted PTFE delaminations (16 mm OD) was manufactured at TDA using Grafil 34-700 prepreg and a [0°/90°] layup orientation before being analyzed using EMICA at a variety of excitation frequencies (FIG. 23). The two delaminations (1 mm and 0.127 mm thick respectively) are located equidistant from each other and the panel edges at a depth of 3 mm from the surface. At 60 kHz, the magnetic field penetrates through the entire ~6 mm thickness of the panel and only the 1 mm thick delamination can be detected. When the frequency is raised to between 120 kHz and 240 kHz, the magnetic "focal point" (i.e. detection depth) moves near the center of the panel (~3 mm) and both delaminations are accurately detected. As the frequency is raised from 480 kHz to 1.8 MHz, the magnetic focal point moves toward the surface of the panel until neither delamination is easily detected and only surface structural information is obtained.

Figure 25:
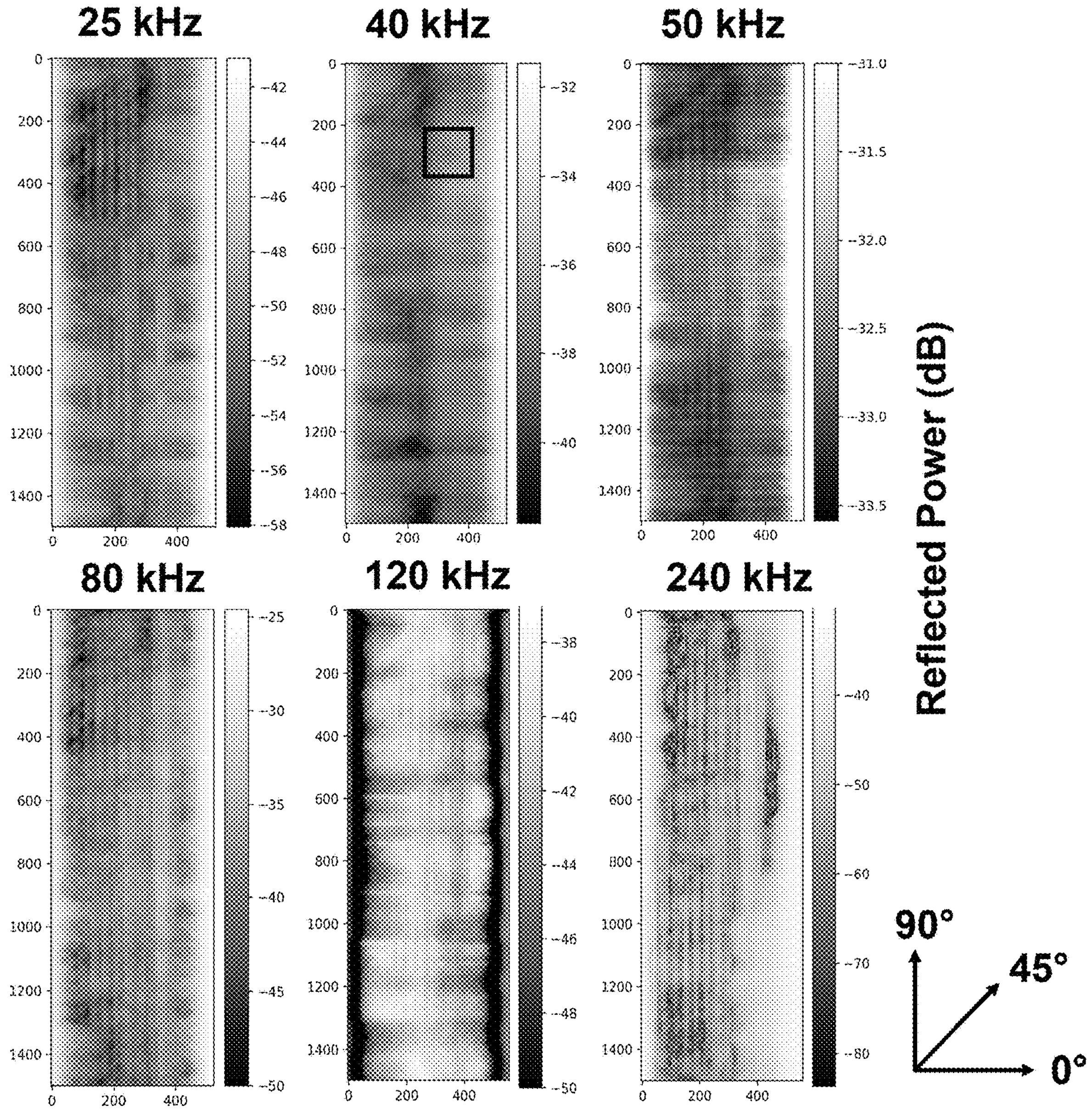

We then expanded our excitation frequency to depth study to include COPV tank form factors. A Type IV COPV that has 3 implanted PTFE delaminations at known locations was imaged using EMICA at various excitation frequencies and a raster step size of 5 mm (FIG. 25). This tank has a known ply layup table with wrap angles and their known depths. Furthermore, Xray CT was used to verify the actual depths of various structural features and a table with each feature and the known depth is shown in FIG. 24. The excitation frequency to depth study on Type IV COPV shows surface 90° hoop wraps at 240 kHz between about 0-3 mm in depth. As the frequency is lowered to 120 kHz, the 12° and 40° helical wraps come into focus at about 3-4.5 mm in depth which corresponds well with the flat panel studies (see FIG. 23). When the frequency drops to 40 kHz, the triangle delamination is brought into focus located at a depth of 6-6.75 mm and is shown with a black square drawn around it. At 25 kHz the magnetic focal point drops below the triangle delamination and the next layer of 90° hoop wraps at 6.75-9 and 9.75-12 mm and 12° helical wraps at 9-9.75 mm are detected.

Example 13. EMICA Signals are a Convolution of Each CF Layer's Contribution to the Total Signal Throughout the Detection Depth When EMICA is used to inductively probe layered CF structures, the primary magentic field decays throughout the depth in a layer-by-layer manner which is incosistent with traditionally understood homogenous conductors. In fact, the surface density of eddy currents can be >10× lower than that of the first ply interface in [0°/90°] layup structures, which directly contradicts the theory of strict exponential decay from the surface, as the standard penetration depth equation represents. For these types of CF structures, there are complex interactions between the individual fibers, ply layers, and the insulating resin matrix in three dimensions that are significantly more complex. The electrical conductivity is significantly higher along the longitudinal (parallel to the fibers) direction and drops in the transverse directions (both laterally and through-thickness), which shows the conductivity of CF is highly anisotropic. Furthermore, more physical contact (i.e. lower interlaminar contact resistance) between fibers in sequential layers with different angles provide conductive paths which eddy currents can be preferentially generated within.

The interlaminar contact resistivity is the lowest and thus the amplitude of induced eddy currents is highest where two orthogonal layers contact each other (e.g. [+45°/−45°] ply interfaces). In this scenario, if the interface between layers is electrically isolated and fiber contact between layers is negligible, then a spike in eddy current density does not occur at the interface.

Figure 26:
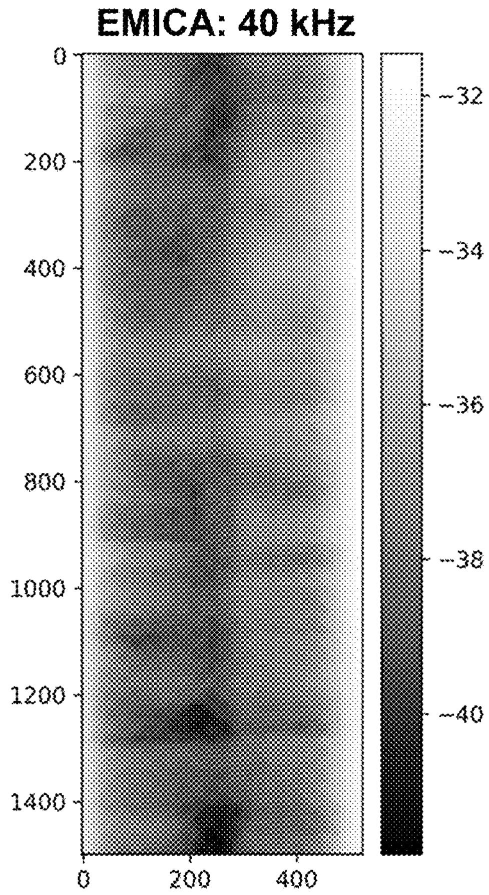
FIG. 26. EMICA image at 40 kHz showing multiple ply angle features which are generated from distinct layer contributions simultaneously in depth. The ply layup table shows that the ±40° angles are located at ~4 mm in depth but are still the most prominent feature in the EMICA image. This can be explained by the schematic which that strong eddy currents (and thus a strong secondary magnetic field) are generated at the nearly orthogonal layer interface which will dominate the EMICA image.
Figure 26:
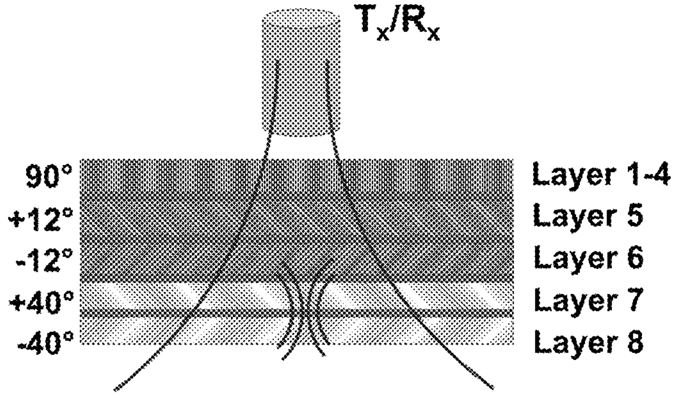

In FIG. 26, an EMICA image at 40 kHz of a Type IV COPV with ~30 mm thick CF overwrap shows multiple ply angle features which are generated from distinct layer contributions simultaneously in depth. The ply layup table shows that the ±400 angles are located at ~4 mm in depth but are still the most prominent feature in the EMICA image (FIG. 26). This can be explained by the schematic showing that strong eddy currents (and thus a strong secondary magnetic field) are generated at the nearly orthogonal layer interface (FIG. 26). This means the 90° and ±12° wrap angles found closer to the surface (shallower) will have a lower contribution to the total EMICA image even though they are located closer to the surface.

Figure 27:
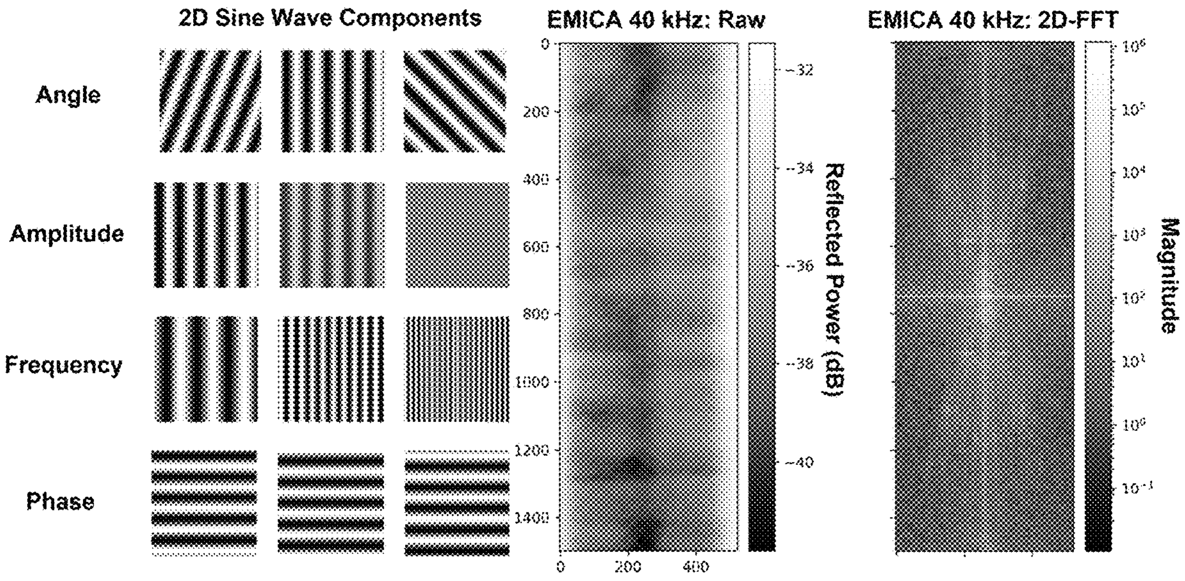
FIG. 27. Example of transforming the 40 kHz EMICA raw image data (reflected power) into the 2D frequency domain via the fast Fourier transform (FFT). Each data point in the 2D Fourier magnitude domain is represented by a single 2D "grating" which is a combination of angle, amplitude, and frequency. The phase is represented by the complex part of the resulting FFT.

Example 14. EMICA Images can be Transformed into the 2D Fourier Domain where Many Spatial Features can be Represented in Just a Few Data Points When a raw spatial image (EMICA map) is converted into the 2D frequency domain via a 2D-fast Fourier transform (2D-FFT), the resulting image can represent the raw data in significantly less data points (i.e. more sparse). The 2D-FFT magnitude carries information about the angle, amplitude, and frequency of the original image while the complex part provides phase information. The spatial frequency image is subsequently shifted so 0 Hz (image background) is located at the central pixel and the frequency increases as you move out radially toward the edges. Angular information is maintained during the transform and can be extracted directly from the 2D-FFT (measured from central column). A raw reflected power EMICA image taken at 40 kHz with a 5 mm raster step size is shown in both the spatial domain and the 2D frequency magnitude domain after 2D-FFT (FIG. 27). It is clear that the data is represented by fewer data points (more sparse) in the spatial frequency domain.

Example 15. EMICA Shows Response in Resonant Frequency, Reflected Power, Real Impedance and Imaginary Impedance which are Related to Internal and External Structural Information in CF When an electromagnetic field (EMF) generated by an EMICA sensor inductively interacts with CF, characteristic changes in the resonant frequency, reflected power, real impedance, and imaginary impedance are observed which are directly related to surface and subsurface structural information of the carbon fiber (CF).

Two flat CF panels (6" long×4" wide×¼" thick) were manufactured at TDA and analyzed using EMICA sensors. The first panel (TDA-03) has two implanted PTFE delaminations (16 mm OD), one is 1 mm thick and the other is 0.127 mm thick, placed equidistant from each other and in the middle of the panel thickness (3 mm). The second panel has two vertical ⅛" wide slots that were cut into the flat panel face using a Dremmel tool, one 1.5 mm deep and the other 3 mm deep.

Figure 28:
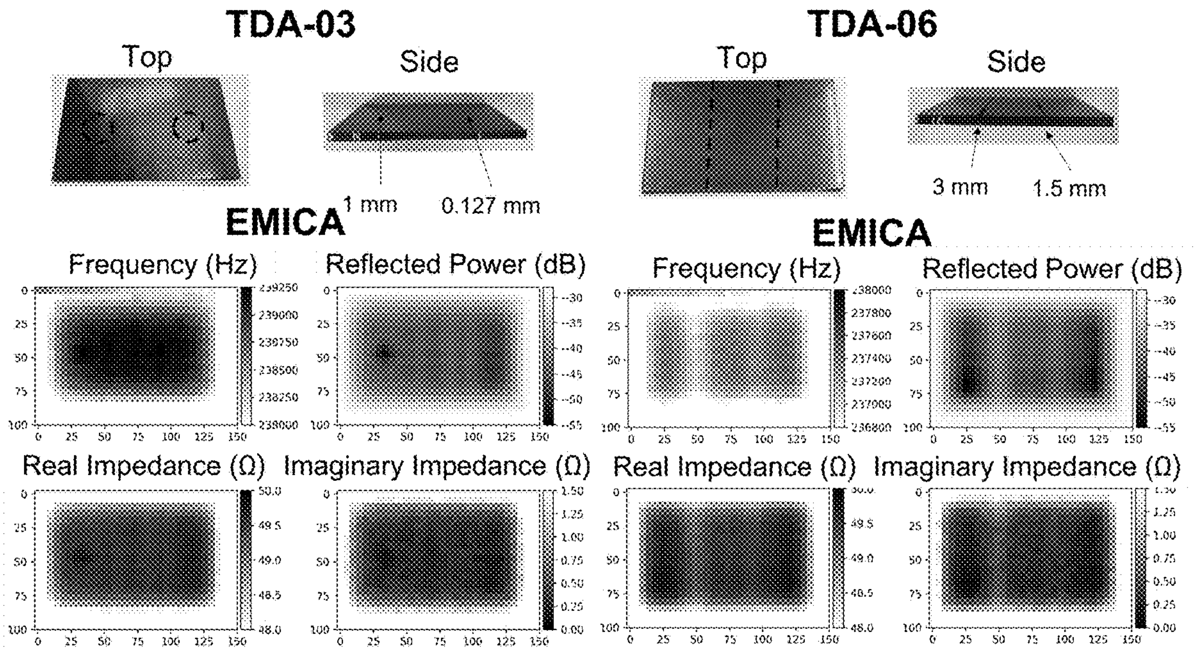
FIG. 28. EMICA shows response in which are directly related to internal and external structural information. Raw EMICA response maps are seen for resonant frequency, reflected power, real and imaginary impedance which provide image-based detection of cuts, delaminations, and [0°/90°] ply angle layups in 6 mm CF Unitape flat panels.

An EMICA sensor operated at 240 kHz was used to image both panels using a 5 mm step size and 0 mm liftoff height from the "healthy" side (i.e. the defects cannot be observed visibly from the probe/measurement side). The raw EMICA maps of resonant frequency, reflected power, real impedance, and imaginary impedance are shown in FIG. 28 which clearly change based on the structural features present in the CF. All four EMICA maps for TDA-03 and TDA-06 can be used to identify the known defects.

Example 16. EMICA Responses can be Recorded as a Function of Spatial Location to Enable Imaging of the CF with the Spatial Resolution Determined by the Raster Step Size When an XY spatial encoder is utilized in conjunction with an EMICA sensor, the absolute spatial location can be recorded simultaneously with the raw EMICA response. The sensor can then be rastered across the CF surface in equal measurement step sizes in both X and Y dimension. This produces a cartesian sampled full resolution image, or EMICA map, with the spatial resolution being directly related to the raster step size. No additional post-acquisition processing needs to be performed to produce EMICA images.

Figure 29:
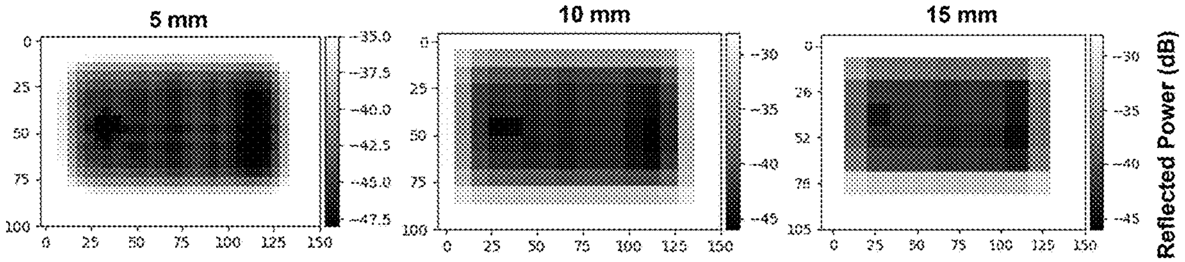
FIG. 29. Using an XY spatial encoder in conjunction with an EMICA sensor enables CF imaging. Changing the raster step size in X and Y dimensions directly correlates to the spatial resolution achievable, which becomes worse as the step size increases.

A flat Unitape CF panel (6" long×4" wide×¼" thick) was manufactured at TDA using Grafil 34-700 prepreg and a [0°/90°] layup orientation before being analyzed using EMICA. The panel (TDA-03) has two implanted PTFE delaminations (16 mm OD), one is 1 mm thick and the other is 0.127 mm thick, placed equidistant from each other and in the middle of the panel thickness (3 mm). An EMICA sensor with a spatial encoder operated at 240 kHz was rastered across the surface of the flat CF panel with our automated gantry using various step sizes from 5 mm-15 mm and a 0 mm liftoff height (FIG. 29). The resulting spatial resolution is directly related to the raster step size and CF structural features. Here, the delaminations have a 16 mm OD and a step size of 5 mm provides true feature dimensions while 10 mm and 15 mm qualitatively identify the defect.

Example 17. EMICA Images can be Compressed in Real-Time During the Data Acquisition for Reducing the Total Acquisition Time or for Improving S/N When a non-uniform spatial sampling pattern is used to acquire EMICA images that collects less than the number of pixels in a "full resolution image", compressed sensing has been applied. This is analogous to compressing a raw image into a JPEG file, albeit instead of performing the compression after the image is acquired, it is performed during the measurement. An under-sampled image is thus created that has purposely missing spatial information in a Gaussian random distribution. An image can then be reconstructed from the under-sampled EMICA map by transforming the raw data into a sparse domain through Fourier transforms, sin/cosine transforms, wavelet transforms, etc. and applying various reconstruction algorithms (two-step iterative shrinkage-thresholding algorithm, gradient projection for sparse reconstruction, etc.). Applying the correct combination of sparse sampling matrix, sparsifying domain, and reconstruction algorithm can provide almost identical information when comparing the under-sampled reconstructed image with its full resolution counterpart. Compressed sensing EMICA imaging uses significantly less measurements which enables faster acquisition times and smaller data file sizes, while providing the same information as full resolution EMICA imaging.

Figure 30:
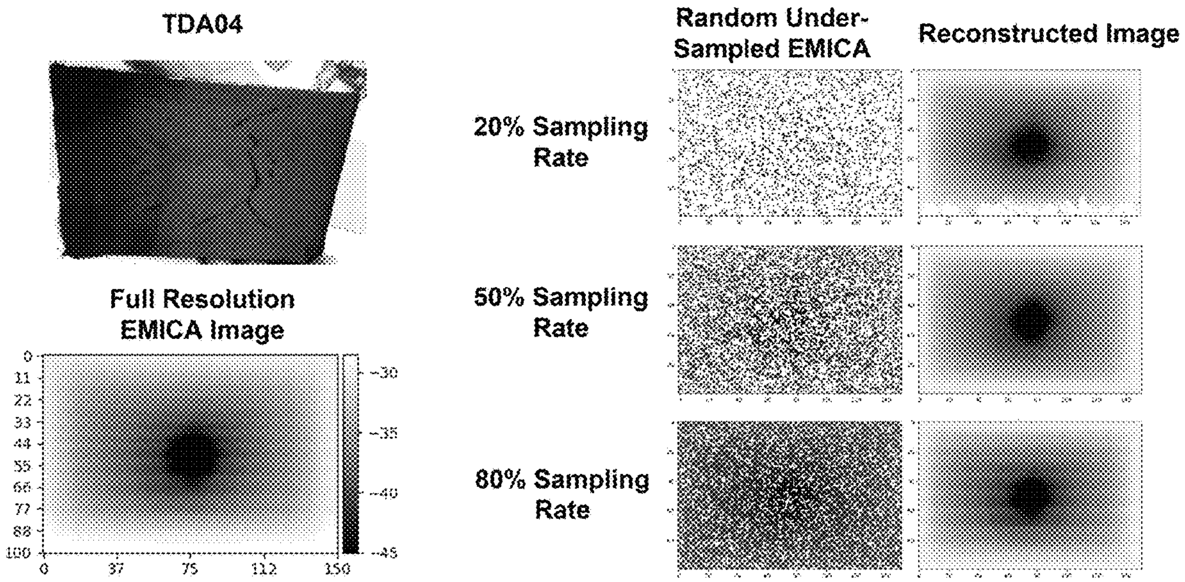
FIG. 30. Experimental implementation of EMICA compressed sensing imaging where a randomly under-sampled image is reconstructed using discrete wavelet transforms (DWT). The resulting reconstructed images provide accurate identification of the large defect using only 20% of the original measurements and increases in similarity as the sampling rate is increased.

An experimental study was performed using a ¼" thick×4" wide×6" long [0°/90°] layup Unitape flat panel which had 19 delaminations implanted directly into the center. This highly damaged panel was used to demonstrate the feasibility of this technique on real experimental EMICA imaging data. Different compression factors (i.e. sampling rate, or the ratio of measurements to the full resolution image number of measurements) were applied using random Gaussian under-sampling patterns during the data acquisition (FIG. 30). At a 20% compression factor, the large delamination is easily identified, and the image becomes closer to the original as the sampling rate is increased. This shows that EMICA imaging can be performed accurately in rapid timeframes using compressed sensing approaches.

Figure 31:
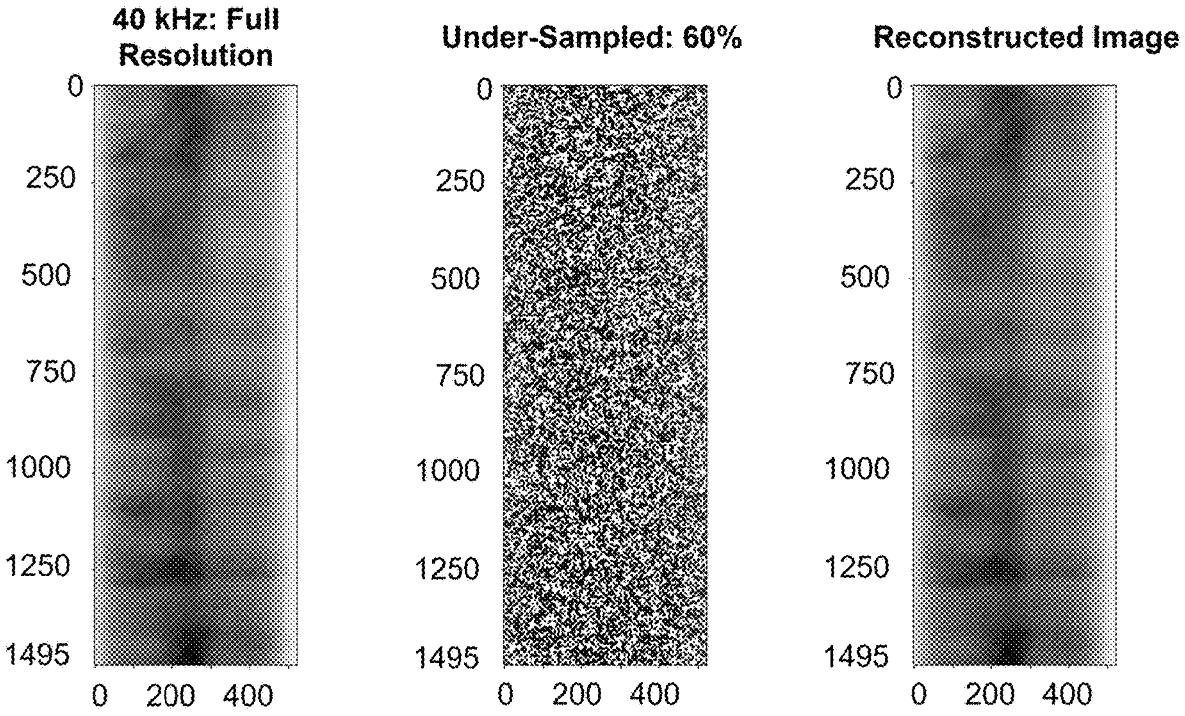
FIG. 31. Simulation of EMICA compressed sensing imaging where an under-sampled image using only 60% of the measurements as the full-resolution image is reconstructed using discrete wavelet transforms (DWT). The resulting reconstructed image has an SSIM of >0.9 and an NMI>1.6 when compared to the full resolution EMICA image using a sym3 wavelet.

A simulation study was then performed on an 86L Type IV (plastic liner) COPV that has three known implanted PTFE delaminations and was imaged using EMICA at a 5 mm step size at 40 kHz to obtain a full resolution image (FIG. 31). A random sampling gaussian mask was applied to the raw image where 40% of the original pixel values are replaced with zeros (analogous to not collecting the data at these specific spatial locations, FIG. 31). The data was transformed from the spatial domain using the discrete wavelet transform (DWT) with a sym3 wavelet which provides a sparse representation of the data. Soft thresholding was applied with an $L_1$-norm minimization iterative algorithm to reconstruct the image. Nearly identical information is obtained from both the full resolution image and the reconstructed image, even though the reconstructed image reduces the acquisition time by 40% (FIG. 31). Four different image comparison metrics were used to quantitatively show the similarity between images. Visual perception-based metrics include the structural similarity index measurement (SSIM) and the normalized mutual info (NMI) score which provide values of 1 and 2 respectively for identical images. Pixel-to-pixel comparisons include the peak signal-to-noise ratio (PSNR) and the mean squared error (MSE) which provide higher and lower values respectively for images that are more similar.

Figure 32:
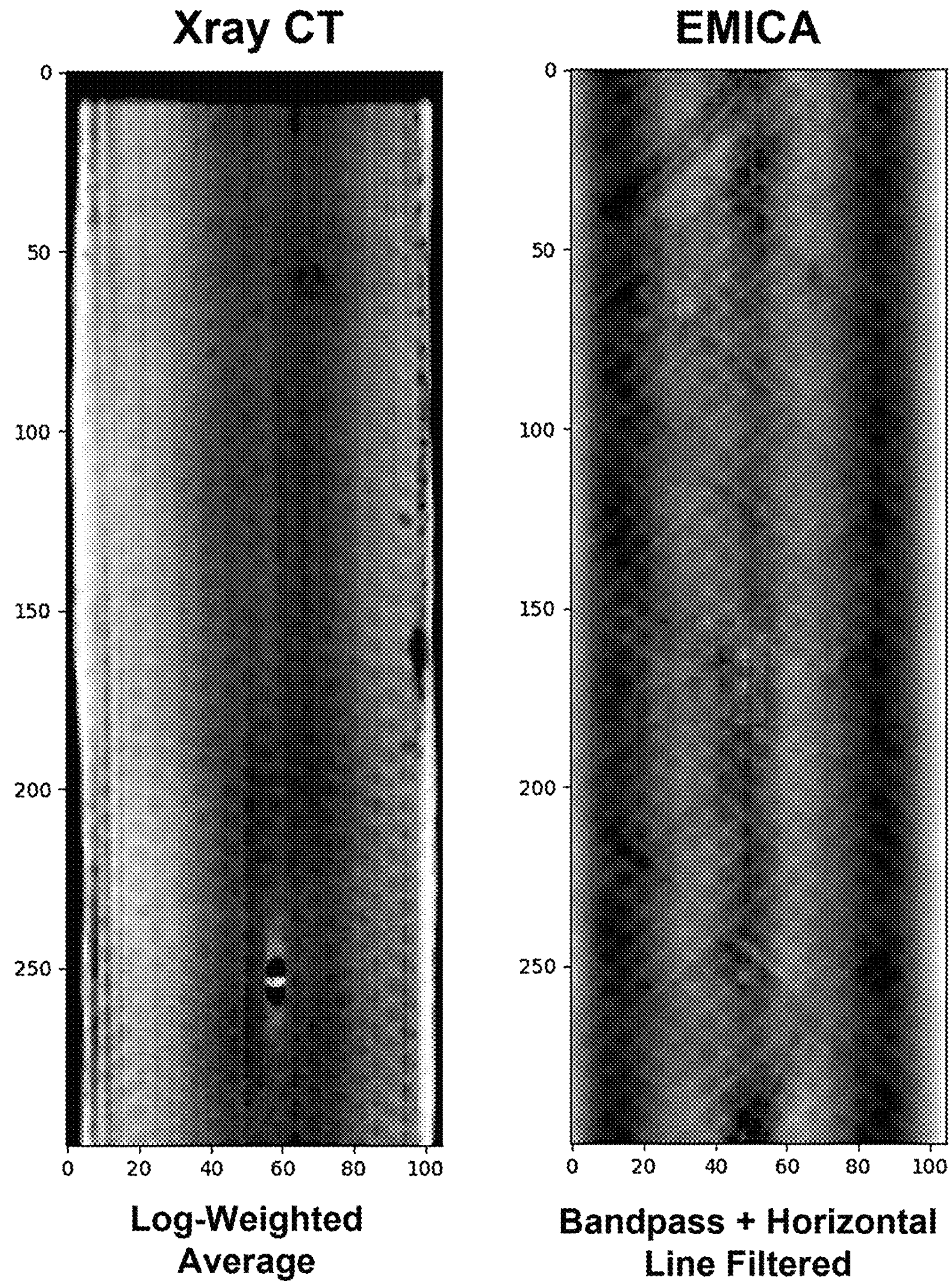
FIG. 32. Comparison of a log-weighted average Xray CT image from ~1-12 mm to an EMICA image acquired using a 40 kHz excitation frequency and a 5 mm raster step size. The EMICA image was filtered to remove the scan line contributions and the image background.
Figure 33:
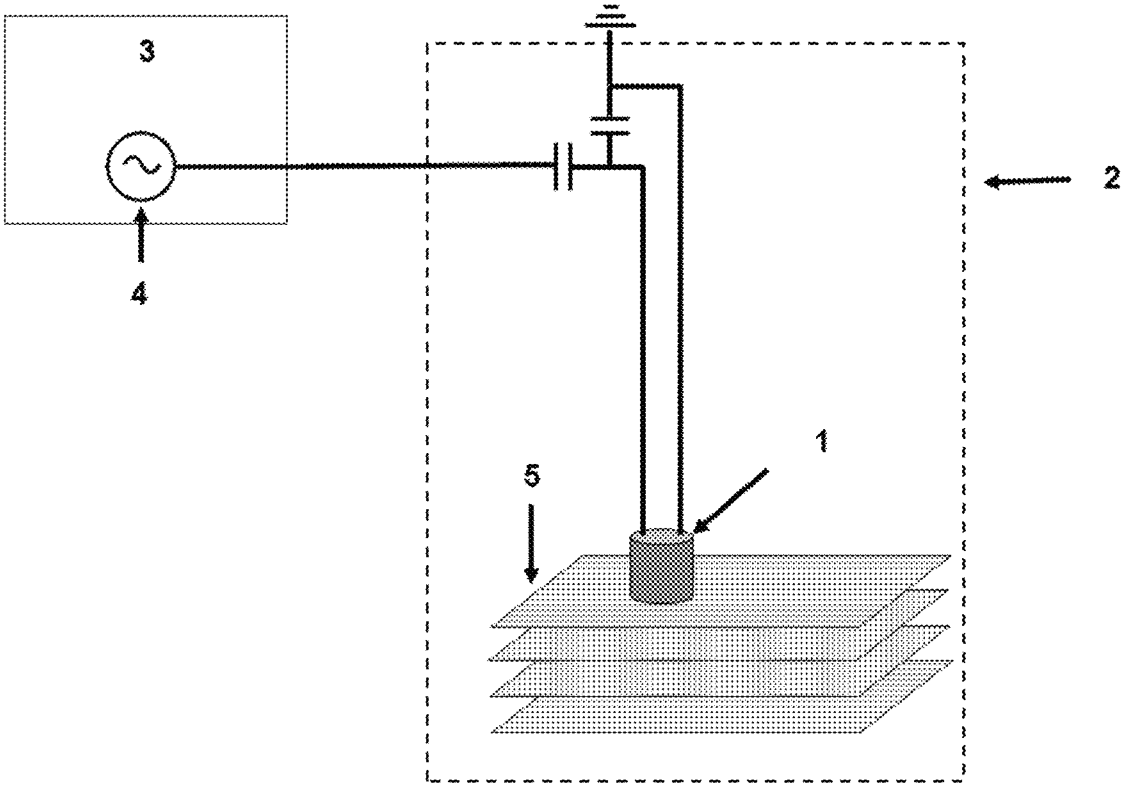
FIG. 33. An electromagnetic-inductive-coupling-analysis (EMICA) device for carbon fiber laminates (5) comprising: an excitor-detector (1) supplied with an alternating current (4), an impedance matched RLC circuit (2) and a vector-network-analyzer (3).

Example 18. EMICA Images Represent a Convolution of Layered Depth Information Similar to a Weighted Average Xray CT Depth Profile When EMICA is used to monitor the structure of CF, the magnetic field decays in a complex manner through the thickness direction (in depth). The decay can be generalized as exponential but there are many complicating factors such as ply layer orthogonality, resistance between plies, conductivity anisotropy, etc. that deviate the true decay from being perfectly logarithmic in CF structures. The resulting EMICA images are thus a convolution of each layer (with some weighting applied to each layer) that the magnetic field inductively interacts with until reaching the limit-of-detection (LOD) in terms of depth. The LOD is directly related to the frequency of the excitation wave used and the structural properties/geometry of the CF. Here, we applied a log-weighted average to Xray CT data from ~1-12 mm in depth on a Type IV COPV and compare the resulting image to an EMICA image that was obtained at 40 kHz and a 5 mm raster step size. The EMICA image was subsequently 2D-FFT filtered using a bandpass and horizontal line filter for removing the background, high frequency noise, and scan measurement lines from the image. The two images are extremely similar in terms of features detected (ply angles, tow-terminations, and triangle shaped PTFE delamination) with the largest difference being the more prominent ±400 angles in the EMICA image. This discrepancy between images shows that the magnetic field does not follow a perfect log-weighted decay when interacting with these complex CF structures and also proves EMICA's ability to provide weighted average Xray CT-like imaging capabilities to at least 12 mm of depth in complex layered CF structures (FIG. 32).

REFERENCES

[1] C. Meola, G. Carlomagno, A. Squillace, and A. Vitiello, "Non-destructive evaluation of aerospace materials with lock-in thermography," *Engineering Failure Analysis*, vol. 13, pp. 380-388, Apr. 1, 2006.

"Non-Destructive Evaluation, Inspection and Testing of Primary Aeronautical Composite Structures Using Phase Contrast X-Ray Imaging," ed. CSEM Centre Suisse D'Electronique et De Microtechnique SA—Recherche et Development: European Comission, 2015.

G. Mook, R. Lange, and O. Koeser, "Non-destructive characterisation of carbon-fibre-reinforced plastics by means of eddy-currents," *Composites Science and Technology*, vol. 61, pp. 865-873, May 1, 2001.

K. Koyama, H. Hoshikawa, and G. Kojima, "Eddy Current Nondestructive Testing for Carbon Fiber-Reinforced Composites," *Journal of Pressure Vessel Technology*, vol. 135, 2013.

G. G. Tibbetts, M. L. Lake, K. L. Strong, and B. P. Rice, "A review of the fabrication and properties of vapor-grown carbon nanofiber/polymer composites," *Composites Science and Technology*, vol. 67, pp. 1709-1718, Jun. 1, 2007.

What is claimed is:

1. An electromagnetic inductive coupling flaw detection device for carbon fiber laminates: comprising, an excitor-detector supplied with alternating current, an impedance matched RLC circuit, and a vector-network-analyzer; wherein the impedance matched RLC circuit and the vector-network-analyzer are impedance matched to 50 Ohm; and wherein, when the electromagnetic inductive coupling flaw detection device is used to measure a sample, the impedance matched RLC circuit comprises the sample.

2. The device of claim 1 further comprising a display that can show a 2-dimensional or a 3-dimensional representation to indicate a flaw location in a carbon fiber laminate.

3. A method of detecting a flaw in a carbon fiber laminate, the method comprising: providing an electromagnetic inductive coupling flaw detection device for carbon fiber laminates, comprising: an excitor-detector supplied with alternating current, an impedance matched RLC circuit, and a vector-network-analyzer, wherein the impedance matched RLC circuit and the vector-network-analyzer are impedance matched to 50 Ohm, further comprising a display that can show a 2-dimensional or a 3-dimensional representation to indicate a flaw location in a carbon fiber laminate; providing a carbon fiber laminate; using the device to apply an electromagnetic field on the carbon fiber laminate; inducing a response in the electromagnetic field in the carbon fiber laminate; using changes in the electromagnetic field to detect the presence or absence of defects including voids, delamination, cuts, inclusions, compression, or impact damage; using an impedance matched RLC circuit and a vector-network-analyzer (VNA) to produce a 2-dimensional or a 3-dimensional map of a flaw location in the carbon fiber laminate, and; using an excitor circuit which is impedance matched to 50 Ohm using a RLC circuit, the same impedance as the VNA and any amplifiers in between the excitor coil and VNA, to ensure high efficiency power transmission and detection.

4. The method of claim 3 further comprising, producing the electromagnetic field (EMF) by the excitor, and reading the response using a second coil or a magnetometer.

5. The method of claim 3 further comprising, using a frequency of the excitor from 900 Hz to 50 MHz.

6. The method of claim 3, wherein the excitor coil may be composed of AWG copper wire or Litz wire, depending on the frequency selection of the 50 Ohm match, to minimize the resistance coming from the excitor coil and thereby increase sensitivity in flaw detection.

7. The method of claim 3, wherein the carbon fiber laminate is a laminate panel or a carbon-fiber overwraps of high pressure vessels.

8. The method of claim 7, wherein the thickness of the carbon fiber in the laminate or COPV can range from 0.1 mm to 35 mm.

9. The method of claim 3, further comprising a data collection technique consisting of full rastering of the excitor coil and detection circuit, which may be the excitor coil or a second excitor coil or magnetometer, over the material under test in the same discrete step.

10. The method of claim 3, further comprising a data collection technique where sub-sampling is employed, and randomized steps are acquired at a smaller number of points to increase analysis speed.

11. The method of claim 3, further comprising a data processing method where in the time and spatial domain data are transformed into the frequency domain by fast-Fourier-transform (FFT), in order to apply high-pass, band-pass, low-pass or other frequency filters to remove specific frequency components.

12. The method of claim 3, further comprising, wherein specific frequency components correspond to real physical structure in the carbon fiber, and the effect of filtering in the frequency domain is to peel off spatial depth layers one by one and review flaws at different depths within the thickness of a carbon fiber piece.

* * * * *